(12) United States Patent
Gutierrez et al.

(10) Patent No.: US 11,899,262 B2
(45) Date of Patent: Feb. 13, 2024

(54) FIBER MANAGEMENT COMPONENTS FOR TELELCOMMUNICATIONS CLOSURES

(71) Applicant: COMMSCOPE TECHNOLOGIES LLC, Hickory, NC (US)

(72) Inventors: Miguel Angel Gutierrez, Chihuahua (MX); Jesus Gustavo Pureco Chico, Chihuahua (MX); Harry L. Vaswani, Garner, NC (US); Genaro Neri, Chihuahua (MX); Luis Carlos Mendoza, Juarez (MX)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 217 days.

(21) Appl. No.: 17/599,917

(22) PCT Filed: Mar. 23, 2020

(86) PCT No.: PCT/US2020/024252
§ 371 (c)(1),
(2) Date: Sep. 29, 2021

(87) PCT Pub. No.: WO2020/205313
PCT Pub. Date: Oct. 8, 2020

(65) Prior Publication Data
US 2022/0196953 A1 Jun. 23, 2022

Related U.S. Application Data

(60) Provisional application No. 62/826,341, filed on Mar. 29, 2019.

(51) Int. Cl.
*G02B 6/44* (2006.01)
*G02B 6/38* (2006.01)

(52) U.S. Cl.
CPC ......... *G02B 6/4446* (2013.01); *G02B 6/3825* (2013.01); *G02B 6/4444* (2013.01); *G02B 6/4452* (2013.01); *G02B 6/4478* (2013.01)

(58) Field of Classification Search
None
See application file for complete search history.

(56) References Cited

U.S. PATENT DOCUMENTS

| 5,892,870 A | 4/1999 | Fingler et al. |
| 6,535,682 B1 | 3/2003 | Puetz et al. |

(Continued)

FOREIGN PATENT DOCUMENTS

| EP | 0 511 147 A1 | 10/1992 |
| EP | 0 805 536 A1 | 11/1997 |

(Continued)

OTHER PUBLICATIONS

International Search Report and Written Opinion of the International Searching Authority for International Patent Application No. PCT/US2020/024252 dated Jul. 21, 2020, 10 pages.

*Primary Examiner* — Rhonda S Peace
(74) *Attorney, Agent, or Firm* — Merchant & Gould P.C.

(57) ABSTRACT

Fiber management assemblies for telecommunications closures. The assembly includes a frame adapted to conform to the wall of a housing piece of a closure. A fiber management tray is pivotally coupled to the frame. The frame supports the tray and spaces the tray away from fiber optic connectors positioned in connector ports defined by the closure. In addition, the pivotability of the tray relative to the frame can provide access to the connectors and/or connector ports without disrupting fiber management on the tray itself.

24 Claims, 21 Drawing Sheets

(56) References Cited

U.S. PATENT DOCUMENTS

| | | | |
|---|---|---|---|
| 7,292,763 | B2 | 11/2007 | Smith et al. |
| 7,477,826 | B2* | 1/2009 | Mullaney ............. G02B 6/4477 385/134 |
| 8,180,191 | B2 | 5/2012 | Blackwell, Jr. et al. |
| 8,213,760 | B2* | 7/2012 | Rudenick ............. G02B 6/4455 385/134 |
| 8,718,434 | B2* | 5/2014 | Gronvall ............. G02B 6/4471 385/139 |
| 10,209,473 | B2* | 2/2019 | Bishop ................. G02B 6/4444 |
| 10,473,873 | B2* | 11/2019 | Diepstraten .......... G02B 6/4446 |
| 10,955,631 | B2* | 3/2021 | Claessens ............. G02B 6/445 |
| 2006/0193588 | A1 | 8/2006 | Mertesdorf et al. |
| 2010/0303433 | A1 | 12/2010 | Gronvall et al. |
| 2013/0022328 | A1* | 1/2013 | Gronvall ............. G02B 6/3897 385/137 |
| 2015/0253530 | A1 | 9/2015 | Alston et al. |
| 2016/0047999 | A1 | 2/2016 | Zoltan et al. |
| 2018/0157002 | A1 | 6/2018 | Bishop et al. |
| 2022/0196953 | A1* | 6/2022 | Gutierrez ............. G02B 6/4452 |

FOREIGN PATENT DOCUMENTS

| | | |
|---|---|---|
| EP | 0 844 504 A2 | 5/1998 |
| FR | 2 900 740 B1 | 12/2008 |
| WO | 95/07478 A1 | 3/1995 |
| WO | 2005/088373 A1 | 9/2005 |
| WO | 2013/003195 A1 | 1/2013 |
| WO | 2015/150204 A2 | 10/2015 |
| WO | 2017/046190 A2 | 3/2017 |
| WO | 2017/046359 A1 | 3/2017 |

* cited by examiner

FIBER MANAGEMENT COMPONENTS FOR TELELCOMMUNICATIONS CLOSURES

CROSS-REFERENCE TO RELATED APPLICATION

This application is a National Stage Application of PCT/US2020/024252, filed on Mar. 23, 2020, which claims the benefit of U.S. Patent Application Ser. No. 62/826,341, filed on Mar. 29, 2019, the disclosures of which are incorporated herein by reference in their entireties. To the extent appropriate, a claim of priority is made to each of the above disclosed applications.

BACKGROUND

Telecommunication applications utilize fiber optic cables that often require fiber optic cable splicing and fiber optic cable storage. Telecommunications closures are often used to store spliced fiber optic cables between one or more nodes in a telecommunications network.

Telecommunications closures are re-reopened by technicians to perform maintenance or fiber management work. For example, components, such as connectors or fibers, can fail and require replacement. In addition, as subscriber needs change, e.g., as subscribers serviced via a given node are added or removed, the routing of optical signals from network side to subscriber side via the telecommunications closure may require adjustment. Typical telecommunications closures manage numerous fibers. Isolating a single component (e.g., a particular fiber or connector) to perform work without disrupting the other fibers and components that use the telecommunications closure can present a challenge.

SUMMARY

This disclosure relates generally to improvements in telecommunications closures, such as, but not limited to, a multiport service terminal (MST). Features of the disclosed telecommunications closures can maximize the closure volume defined by the closure for fiber management purposes. Closure volumes are often limited to reduce the overall profile and/or heft of the closure, and it is generally desirable to maximize both the amount and types of fiber management that can be performed within that confined space. Thus, features of disclosed closures can provide both improved efficiency and improved flexibility in how telecommunications closure volumes are used for fiber management.

The closures of the present disclosure typically include first and second housing pieces that cooperate to provide a re-enterable closure volume. When closed, the closure volume can be sealed off from ingress by one or more outside contaminants. Optical fibers enter the closure and are managed within the closure volume. Typically, the optical fibers enter the closure volume via a cable port adapted to seal around the cable, e.g., with a gel block seal. In certain closures, such as MSTs, the closure may also define connector ports. Typically, the connector ports are hardened to provide adequate ruggedness and sealing capabilities. Connectorized optical fibers (e.g., in the form of drop cables) that are external to the closure are connected to connectorized optical fibers that are within the closure volume via the connector ports. The connector ports typically include adapters of a pre-set form factor. For example, a given connector port defined by a closure includes an adapter configured to accommodate SC-form factor connecters; another connector port defined by a closure includes an adapter configured to accommodate MPO-form factor connectors. A given closure, e.g., a given MST, can define ports of multiple different form factors.

According to certain aspects of the present disclosure, a telecommunications closure comprises first and second housing pieces configured to cooperate to define a re-enterable closure volume, the first housing piece including a plurality of connector ports adapted to mate with fiber optic connectors and an interior wall that defines a fiber management volume of the closure volume; and a frame configured to connect to a fiber management tray, the frame including an outer wall defining an opening within the frame and configured to conform to the interior wall of the first housing piece, a plurality of the connector ports being accessible through the opening defined by the outer wall of the frame for installing connectors in, or removing the connectors from, the plurality of connector ports when the frame is coupled to the first housing piece.

According to further aspects of the present disclosure, a telecommunications closure comprises first and second housing pieces configured to cooperate at an interface to define a re-enterable closure volume, the first housing piece including an interior wall that defines a fiber management volume of the closure volume, the fiber management volume being bounded by a reference plane defined by the interface; and a fiber manager comprising: a frame, the frame including an outer wall defining an opening within the frame and configured to conform to the interior wall of the first housing piece; and a fiber organizing tray, the fiber organizing tray and the frame being configured to cooperate with each other and with the first housing piece such that no portion of the frame or the fiber organizing extends through the reference plane. In some examples, the fiber organizing tray, the frame and the first housing piece are configured to cooperate such that one or more portions of the fiber organizing tray extends to, but not through, the reference plane. In some examples, the fiber organizing tray, the frame and the first housing piece are configured to cooperate such that one or more portions of the fiber organizing tray and one or more portions of the frame extend to, but not through, the reference plane.

According to further aspects of the present disclosure, a telecommunications closure comprises first and second housing pieces configured to cooperate to define a re-enterable closure volume, the first housing piece including a plurality of connector ports adapted to mate with fiber optic connectors and an interior wall that defines a fiber management volume of the closure volume; and a fiber manager comprising: a frame, the frame including an outer wall defining an opening within the frame and configured to conform to the interior wall of the first housing piece; and a fiber organizing tray, the fiber organizing tray and the frame being configured to cooperate to define first and second configurations of the fiber manager, wherein in the first configuration first and second opposite sides of the tray are connected to first and second opposing sides, respectively, of the outer wall of the frame; and wherein in the second configuration one of the first and second opposite sides of the tray is not connected to the corresponding first or second side of the outer wall such that a first of the connector ports is accessible through the opening defined by the outer wall of the frame for installing a connector in, or removing the connector from, the first connector port.

According to still further aspects of the present disclosure, a method of managing optical fibers at a telecommunications closure, the closure including first and second housing pieces configured to cooperate to define a re-enterable closure volume, the first housing piece including a plurality of connector ports adapted to mate with fiber optic connectors and an interior wall that defines a fiber management volume of the closure volume, comprises: providing a fiber manager comprising a fiber organizing tray and a frame, the frame including an outer wall defining an opening within the frame; coupling the outer wall of the frame to the interior wall of the first housing piece, such that the outer wall conforms to the interior wall of the first housing piece; pivotally coupling a fiber organizing tray to the frame; pivoting the tray relative to the frame such that at least a first of the connector ports is accessible through the opening defined by the outer wall of the frame for installing a connector in, or removing the connector from, the first connector port; and installing the connecter in, or removing the connector from, the first connector port.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DESCRIPTION OF THE FIGURES

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
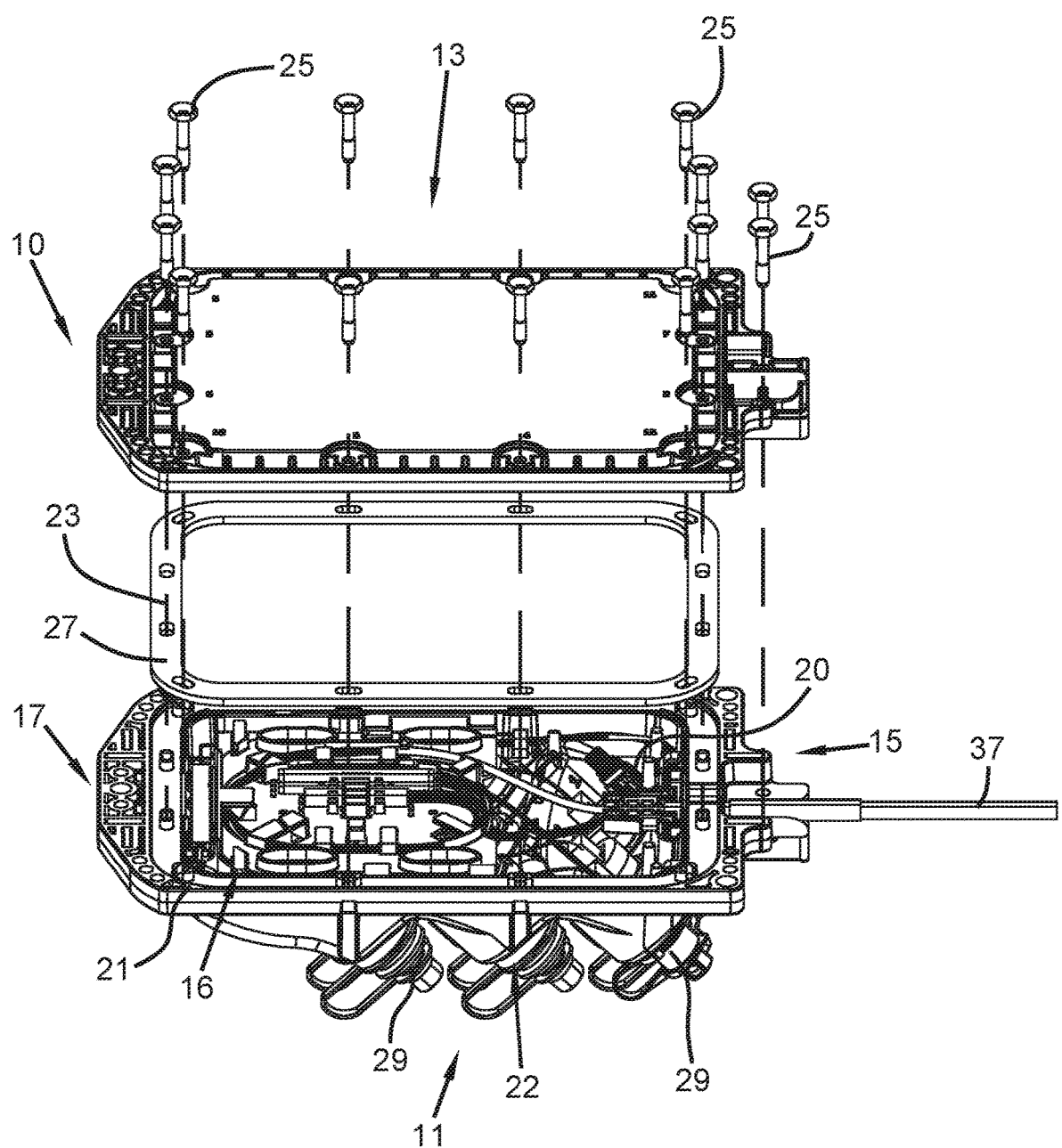
FIG. 1 is a partially exploded view of an example telecommunications closure in accordance with the present disclosure.
Figure 2:
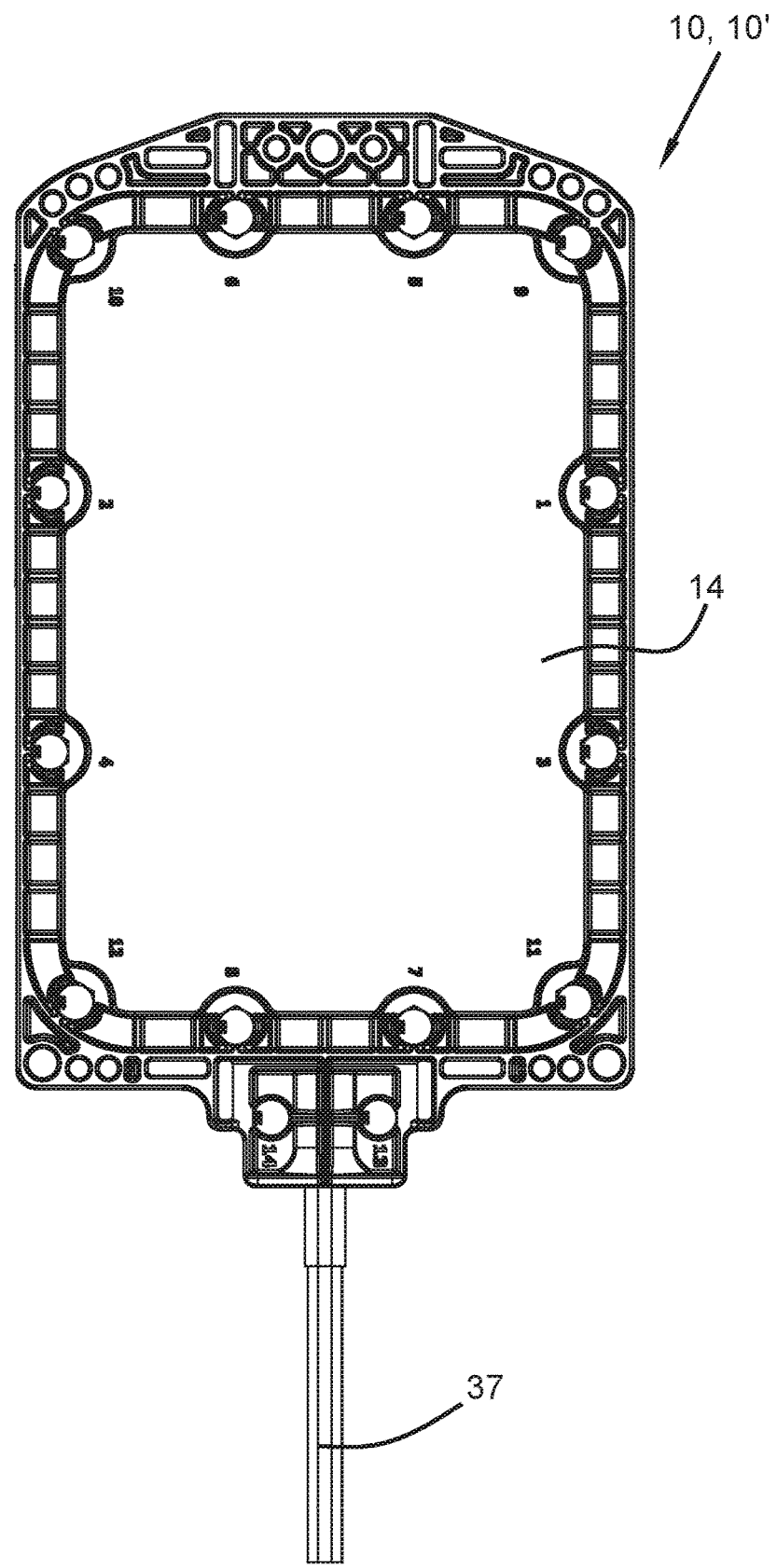
FIG. 2 is a bottom view of the closure of FIG. 1, the closure being in a closed configuration.
Figure 3:
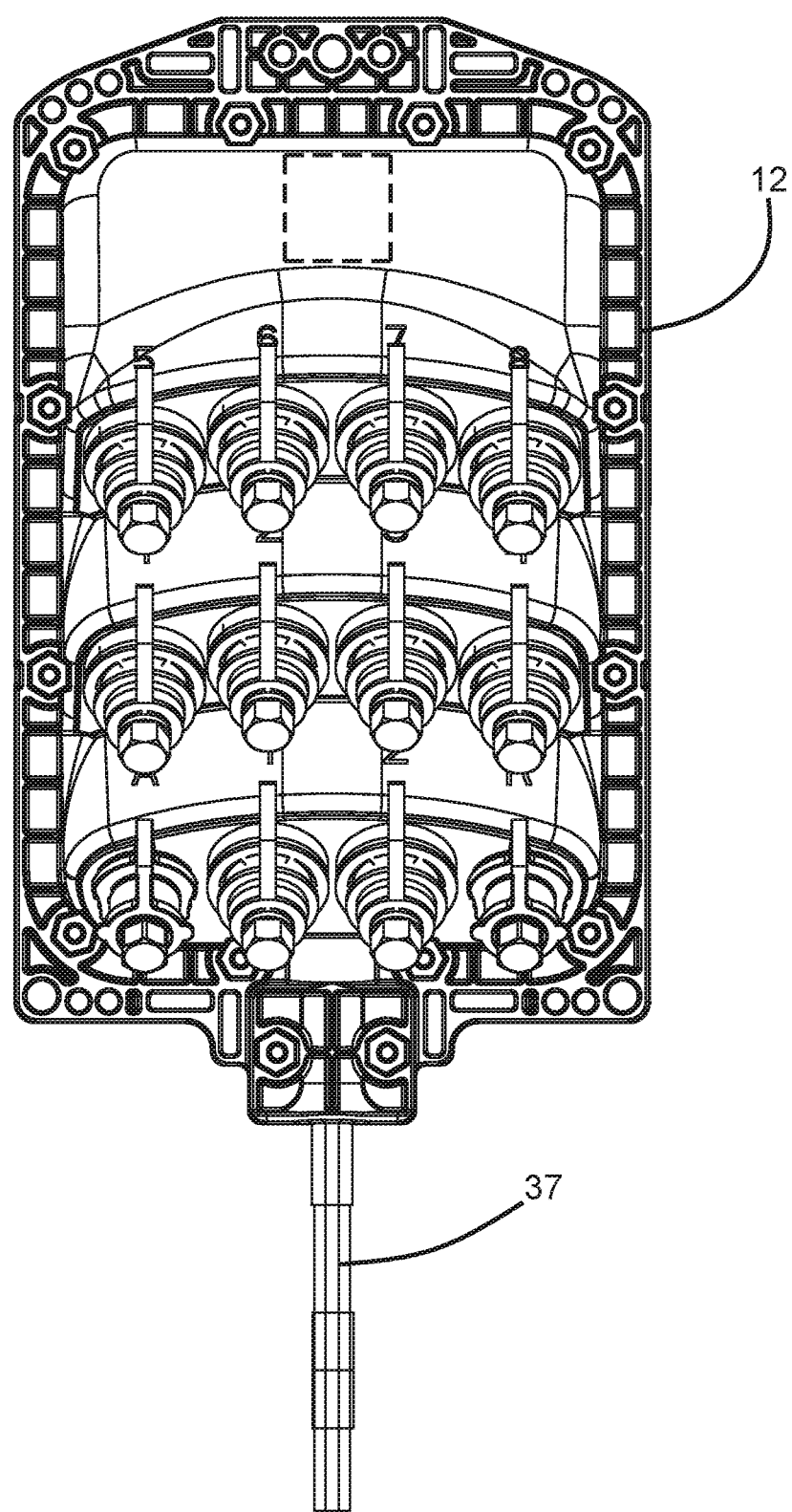
FIG. 3 is a top view of the closure of FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIGS. 1-4, and 7-8, a closure 10, 10' or portions thereof, are shown. In this example, the closure 10, 10' is a MST. The closure 10, 10' can serve as a node in a telecommunications signal network. The closure 10, 10' can be used indoors, outdoors, aerially (e.g., attached to a telephone pole), underground (e.g., positioned in a manhole), or other locations. When closed, the closure 10, 10' provides protection to interior components of the closure from the environment external to the closure 10, 10'.

For ease of description only, the closure 10, 10' is considered to have a top 11, a bottom 13, a front 15, and a back 17, and extends from front to back parallel to a longitudinal axis 19.

Figure 21:
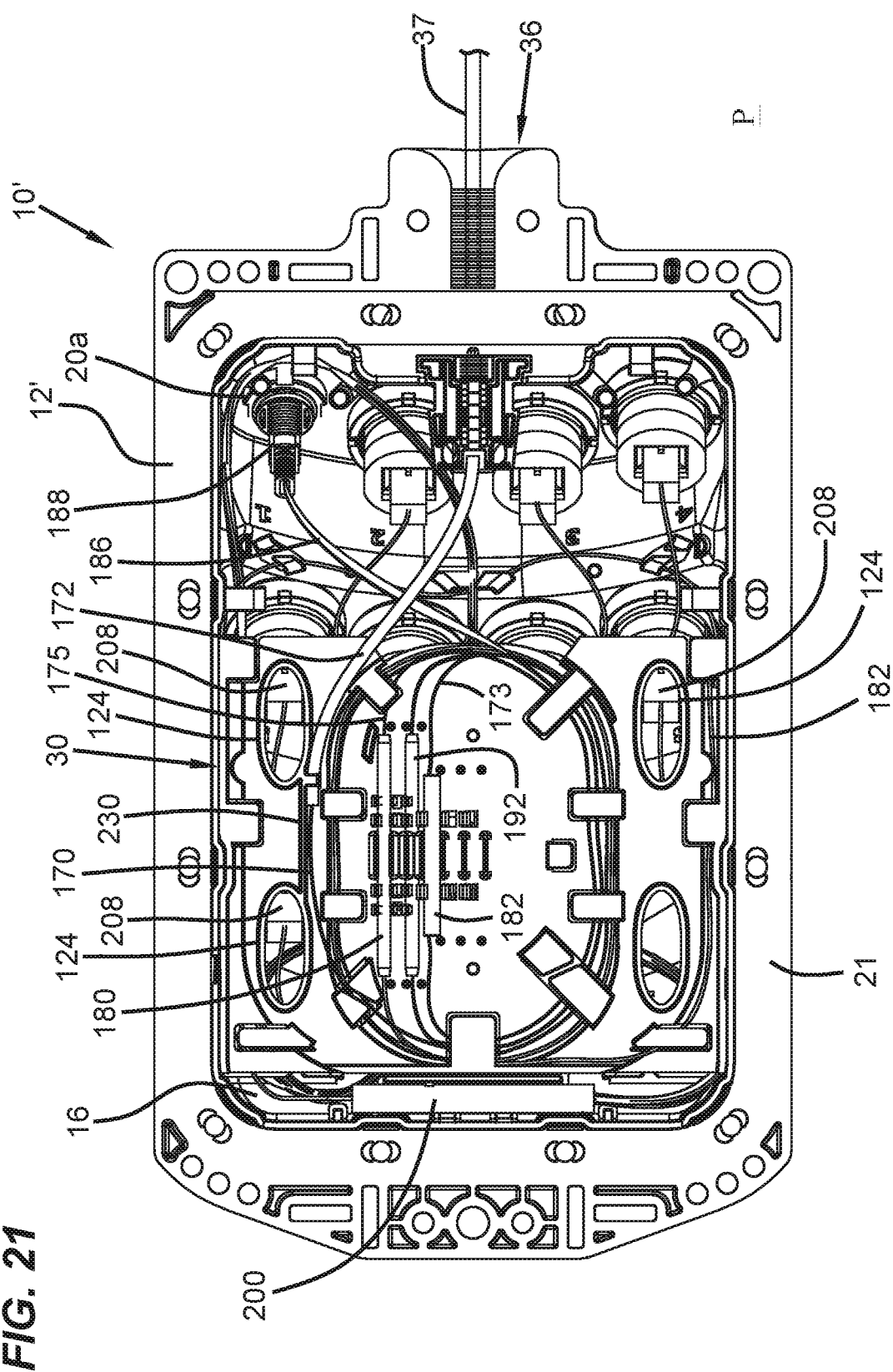
FIG. 21 is a bottom view of the portion of the closure of FIG. 4, illustrating an example fiber routing scheme.

The closure 10, 10' includes a first housing piece 12, 12' and a second housing piece 14. The housing pieces 12, 12' and 14 cooperate at an interface 21 to provide a re-enterable and sealable closure 10, 10'. When closed, the closure 10' defines a closure volume. At least a portion of the closure volume is a fiber management volume 16 defined by the first housing piece 12, 12' and, in particular, defined by an interior wall 18 of the first housing piece 12, 12'. The interface defines a reference plane P, which is the plane of the page in FIG. 21. In some examples, a seal or sealing member 23 (e.g., a gel seal, a gasket) is positioned between the housing pieces 12, 12' and 14, the sealing member 23 aligning with the interface 21 when the closure 10, 10' is in a sealed configuration. Thus, a surface 27 of the sealing member 23 can lie in the reference plane P (FIG. 21). Fasteners 25 can be used to sealingly secure the housing pieces 12, 12' and 14 to each other about the seal 23 at the interface 21.

The housing piece 12, 12' also defines a plurality of connector ports 20, 22. The connector ports 20, 22 can be numbered and arranged as appropriate. In at least some examples, the connector ports 20 are arranged in a single row of four of the ports 20, and the connector ports 22 are arranged in two rows of four of the ports 22 each, the rows of connector ports 22 being oriented substantially parallel to the other row of connector ports 20. Thus, in some examples the closure 10, 10' can be referred to as a 4×3 MST, referring to the 3 rows of 4 connector ports defined by the closure housing. Other numbers and arrangements of connector ports may be provided instead. For example, one or more of the rows can have fewer than four ports. The ports can be evenly or non-evenly spaced within a given row and/or across rows.

The number of connector ports used and how they are used can depend on a given set of connectively requirements for the closure and how the closure is to be used for one or more of splicing fibers, splitting fibers, connecting fibers from point to point (e.g., without splitting them), indexing fibers, and so forth. The fiber manager of the present disclosure can facilitate various fiber management operations depending on specific needs. Some connector ports can be active, while others inactive. Some connector ports can be fitted with structures to receive and hold connectors. Some connector ports can be fitted with structures (e.g., adapters) to receive and hold connectors of a specific form factor. Some connector ports can lack structures (e.g., adapters) to receive and hold connectors. In addition, the arrangement of which ports accommodate which form factor connectors can also be customized. In one non-limiting example, one or more front row ports 20 accommodate MPO connectors while one or more ports behind the front row accommodate SC connectors. In another non-limiting example, the front row can include a port that accommodates an SC connector and a port that accommodates a MPO connector. When not in use, connector ports, whether or not they contain adapters, can be plugged with plugs 29 from the outside to minimize ingress of contaminants into the closure volume through the ports.

In example configurations of the connector ports, one or more of the connector ports 20, 22 defines interior structures adapted to mate with and thereby hold in optical alignment a pair of fiber optic connectors, one of the connectors terminating one or more optical fibers positioned in the fiber management volume 16, and the other connector terminating one or more optical fibers positioned external to the closure 10. In some examples, the ports 20, 22 define fiber optic adapter structures for this purpose. Optionally, as mentioned, sealable plugs 29 can be provided on the external side of the closure 10 to seal off the ports 20, 22 when no connector is present therein.

The connector ports 20, 22 are positioned such that connectors enter the ports at angles that are oblique to the longitudinal reference axis 19. This oblique angle (rather than a perpendicular angle), allows the fibers extending from the connectors within the fiber management volume to be managed and routed within fiber management volume without over-bending them beyond their minimum bend radii, and while maintaining a relatively slim profile for the overall closure from top 11 to bottom 13.

As mentioned, the connector ports defined by the closure can accommodate different connector form factors. In the example depicted, the connector ports 20 are adapted to accommodate (i.e., mate with) MPO form factor connectors, and the connector ports 22 are adapted to accommodate SC form factor connectors.

Seated within the fiber management volume 16 is a fiber manager 30. The fiber manager 30 includes a frame 32 and a fiber managing tray 34. To maximize usable volume of the fiber management volume 16, when the fiber manager 30 is fully seated in the housing piece 12' (FIGS. 4, 21), no portion of the fiber manager extends through the plane P. To further maximize the fiber management volume 16, and to provide sufficient space above the fiber manager to route fibers without over-bending, the fiber manager 30, including portions of both the frame 32 and the tray 34, is sized and configured to extend to the plane P but not through the plane P.

The housing piece 12 also defines a sealable main cable port 36 adjacent the front 15 of the closure 10. The main cable port 36 is adapted to seal around a main cable 37 (e.g., with a grommet 41 (FIG. 5)) carrying optical fibers that are then routed to connectorized cables via the closure volume, or otherwise stored within the closure volume. Typically, the portion of the main cable 37 that is within the closure volume has its outer jacket, and optionally, strength members, stripped. The main cable 37 can hold one or more single fibers, which can be split or not split within the closure and spliced within the closure to connectorized single fibers. The main cable 37 can also hold (instead of or in addition to one or more single fibers) ribbonized fibers, which can be indexed and/or spliced to connectorized ribbonized fibers within the closure. In some examples, the optical fibers carried by the main cable 37 are fed into a buffer tube within the closure (alternatively, the main cable 37 itself can include one or more buffer tubes that hold the fibers). The buffer tube protects the fibers between the point where the outer jacket is stripped and the fiber manager 30. Once on the fiber manager, the fibers exit the buffer tube and can be managed on the fiber manager 30. Such fiber management can include, for example, one or more of slack storage, splicing, splitting, indexing, wave division multiplexing, etc., with the tray fiber manager 30 providing features for one or more of these types of management. Fibers from the main cable can be spliced, on the tray 34, to other fibers that have connectorized ends that mate with the connector ports 20 or 22 and through optical connections at those ports, to connectorized cables (e.g., drop cables). Many other fiber routing and management schemes are also possible.

Figure 4:
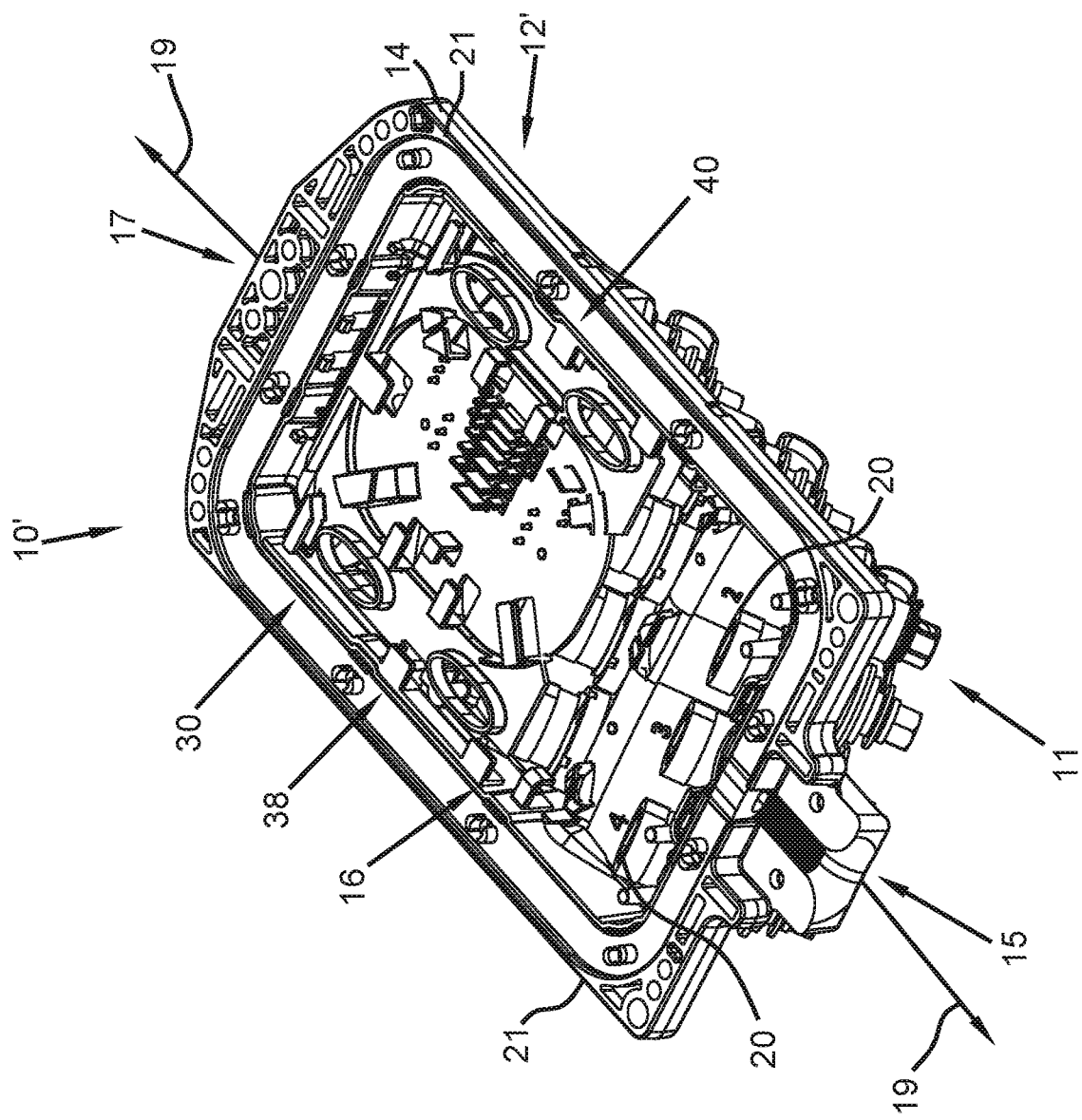
FIG. 4 is a perspective view of a portion of a further example closure including a fiber manager in accordance with the present disclosure.

Referring to FIG. 4, the fiber manager 30 is in a first configuration in which the tray 34 is connected to the frame 32 at two opposite sides 38, 40 of the fiber manager 30. In this configuration the tray 34 substantially covers (from below) the connector ports 22, preventing sufficient access to the connector ports to, e.g., install or remove a connector therefrom.

Figure 5:
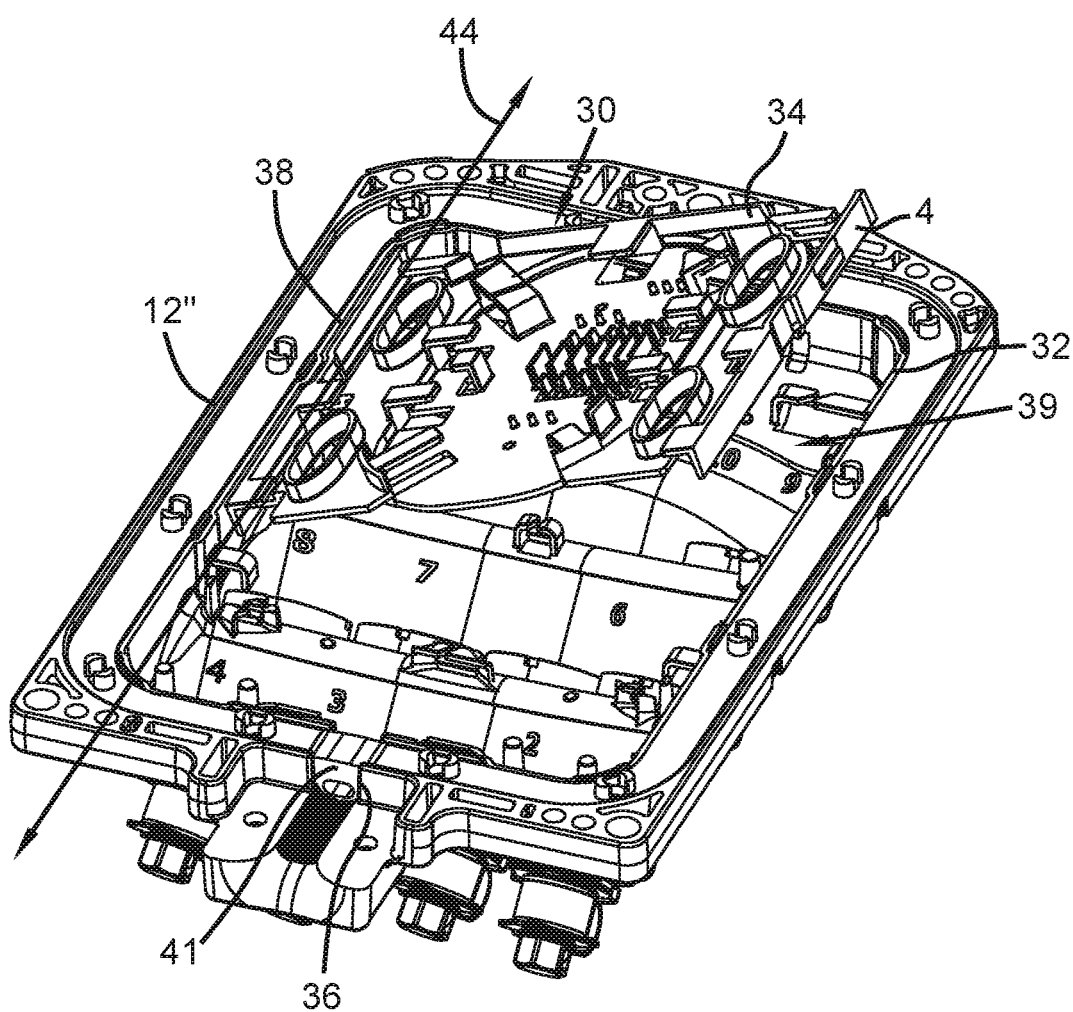
FIG. 5 is a perspective view of a portion of a further example closure in accordance with the present disclosure including the fiber manager of FIG. 4 in a pivoted configuration.
Figure 6:
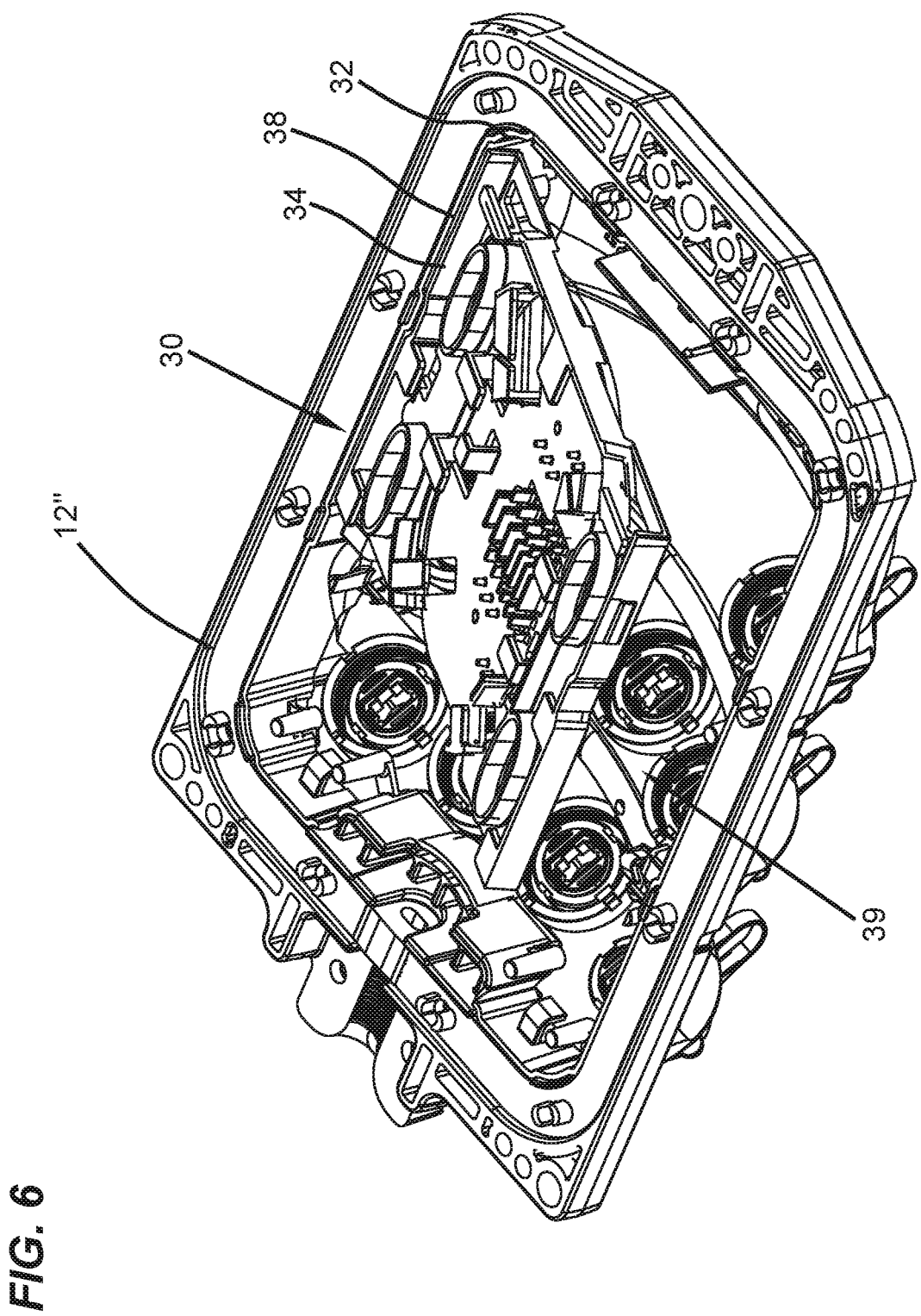
FIG. 6 is a further perspective view of the portion of the closure of FIG. 5, including the fiber manager in a pivoted configuration.
Figure 7:
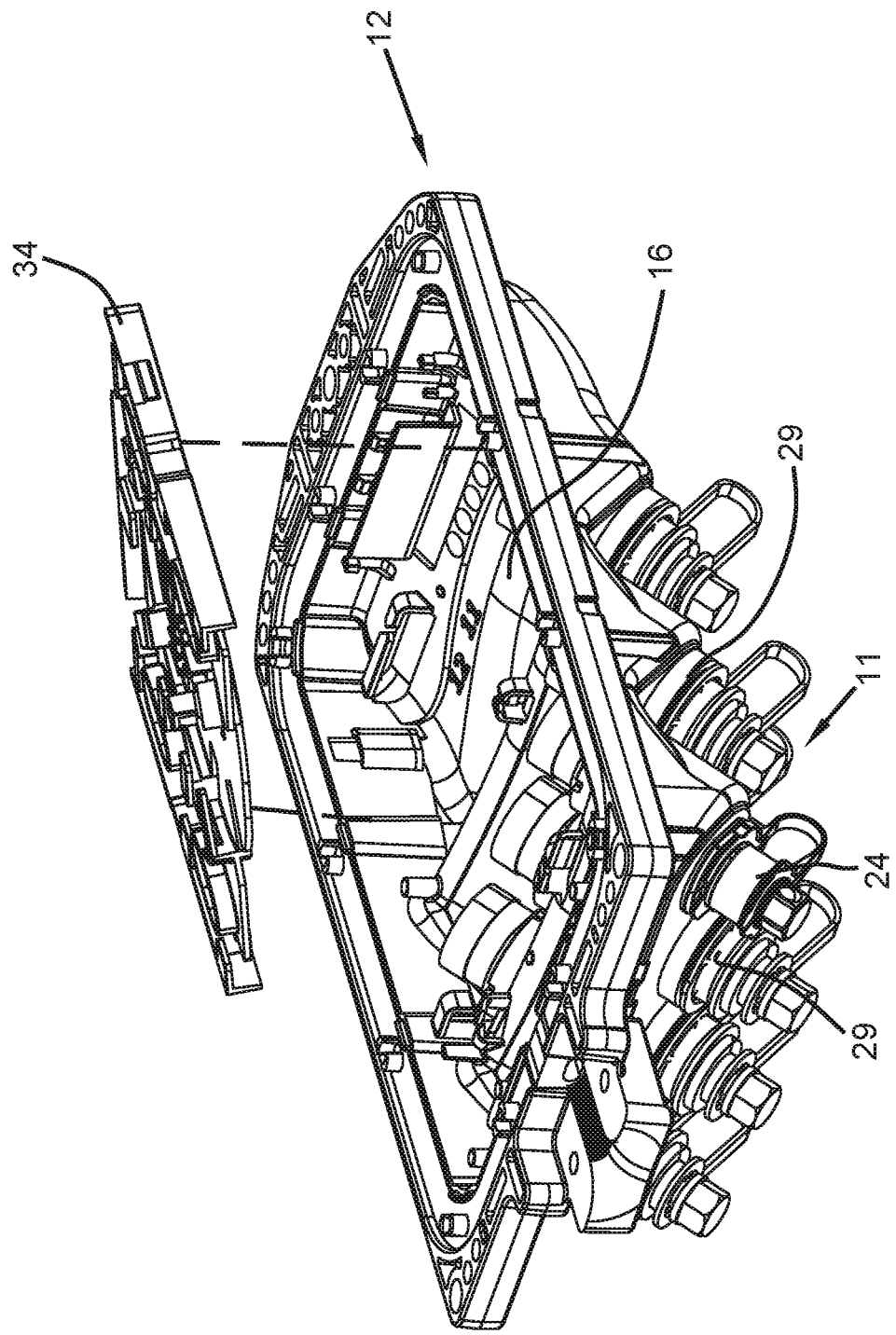
FIG. 7 is a partially exploded view of the portion of the closure of FIG. 4.
Figure 8:
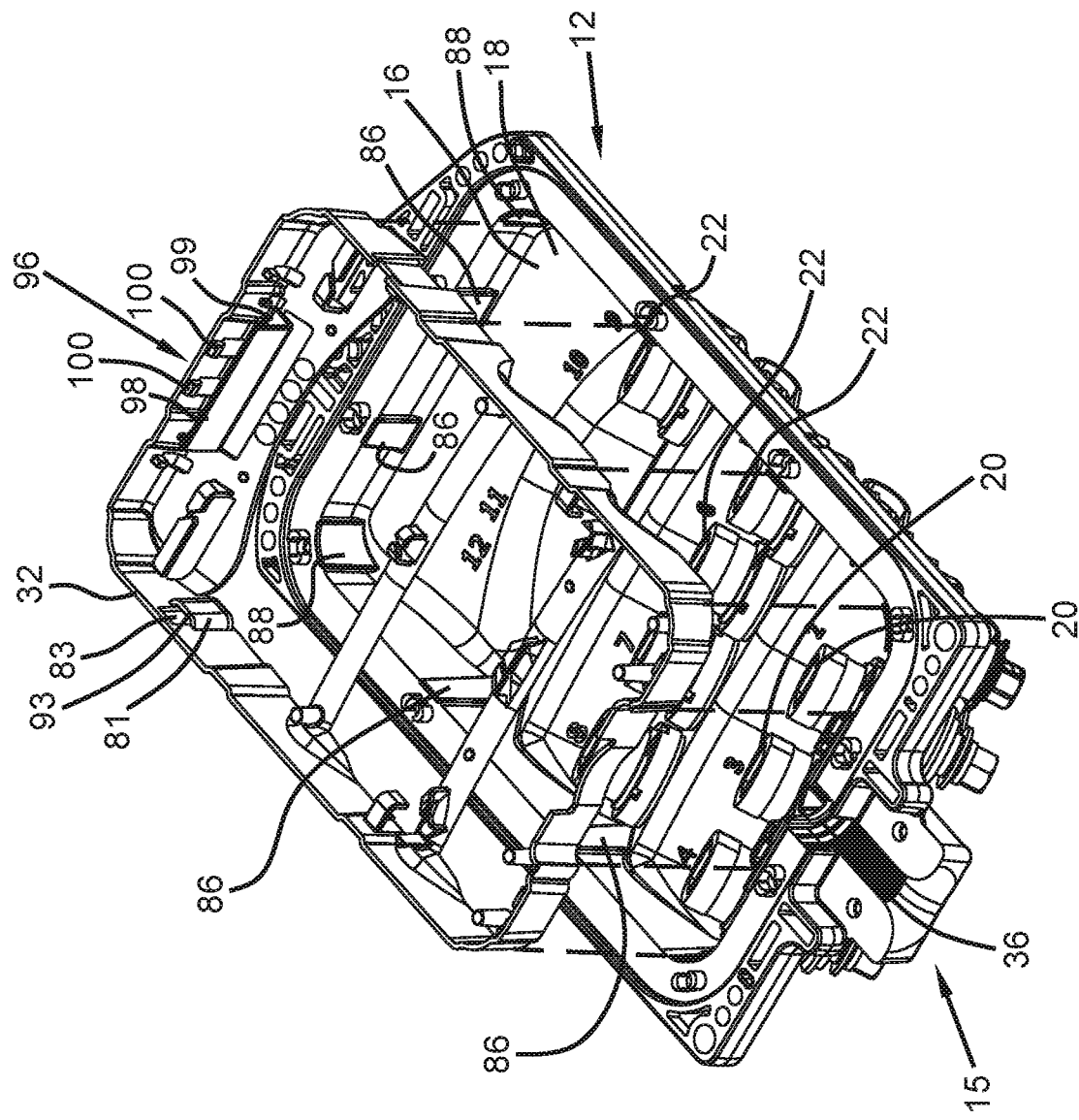
FIG. 8 is a partially exploded view including parts of the portion of the closure of FIG. 4.

Referring to FIGS. 5-6, the fiber manager 30 is in a second configuration (with respect to a housing piece 12") in which a side 42 of the tray 34 has been disconnected from the frame 32 and pivoted away from the frame about a pivot axis 44 adjacent the side 38 of the fiber manager 30. In this configuration, the tray 34 and the frame 32 remain connected or at least abutting each other at or adjacent the side 38 of the fiber manager 30. In addition, the connector ports 20, 22 are accessible via the spacing 39 provided by the pivoting of the tray 34 to, e.g., install a connector therein or remove a connector therefrom. For example, a connector that has operatively failed may need to be replaced. To replace such a connector, the tray 34 is disconnected from the frame 32 at the side 40 of the fiber manager 30 and pivoted about the pivot axis 44 as shown in FIGS. 5-6 to access the faulty connector through the spacing 39 and the opening 46 defined by the frame 32. It should be appreciated that the opening 46 is large enough to access multiple of the connector ports therethrough. The faulty connector can then be fixed, or removed and replaced. If removed and replaced, fiber slack stored on the tray 34 or elsewhere within the fiber management volume 16 is used to provide sufficient fiber length to the newly connectorized fiber. Once the work on the connector(s) is completed, the tray 34 can be pivoted back to the configuration shown in FIG. 4, and the closure can then be closed.

The pivot axis 44 is aligned with or adjacent the side of the tray 34 where fibers exit the tray en route to, e.g., a splitter. Optionally, no fibers are routed onto or off of the tray 34 adjacent the opposite side of the tray (i.e., the side opposite the pivot axis). Thus, pivoting of the tray to the configuration shown in FIGS. 5-6 does not disrupt, or disrupts only minimally, the existing fiber management on the fiber manager 30.

The cooperation of the manager 30 and the housing piece 12" as described is identical to that of the manager 30 and either of the housing pieces 12, 12'.

For purposes of this disclosure, the closures 10 and 10' differ from each other only with respect to the number and/or arrangement of connector ports. Likewise, for purposes of this disclosure, the housing pieces 12, 12', and 12" differ from one another only with respect to the number and/or arrangement of connector ports.

Referring now to FIGS. 9-16, the example frame 32 of the fiber manager 30 will be described in more detail. The frame 32 extends along a major axis 50 between a front 54 and a back 56 of the frame 32, and along a minor axis 52 between a side 58 and a side 60 of the frame 32, the major and minor axes 50, 52 being perpendicular to each other.

The frame 32 includes an outer wall 62 that defines an outer perimeter of the frame. 32. The outer wall includes a front portion 64, a back portion 66, and opposite side portions 68 and 70. Cross support members 72 and 74 extend between the side portions 68 and 70. In this example, the cross support members 72 and 74 have a bow shape (see FIG. 16), bowed towards the top of the closure 10 when the frame 32 is coupled to the housing piece 12 (FIG. 5). Fiber guides 76 and 78 are provided centrally on the cross support members 72 and 74. Due to the bowed shape of the cross support members 72 and 74, fibers that are guided through the guides 76 and 78 have greater clearance from the housing piece 14 and are therefore less likely to be damaged when closing the closure 10. Additional fiber guides 80 are provided on either side of the fiber guide 76 on the cross support member 72.

The outer wall 62 is shaped and sized to conform to, and nest within, the interior wall 18 of the first housing piece 12, 12' (FIG. 4) and couple thereto by interference fit. In this example, the outer wall 62 defines coupling features that are complementary to coupling features defined by the interior wall 18 of the first housing piece 12, 12', 12". In particular, the outer wall 62 defines a plurality of recesses 82 on each of the four portions 64, 66, 68 and 70, and also recesses 84 in corner regions of the outer wall 62. The recesses 82 are complementary to ribs 86, 88 defined by the interior wall 18 of the first housing piece (see FIG. 4). When the frame 32 is seated in the housing piece 12, 12', 12" the ribs 86 engage the recess 82 and the ribs 88 engage the recesses 84 to provide a strong interference fit between the frame 32 and the interior wall 18 of the housing piece 12, 12', 12". Optionally, as depicted, the recesses and the corresponding ribs taper in width from bottom to top assist in guiding the ribs into the recesses when seating the frame 32 within the housing piece 12, 12', 12".

Support posts 90 extend downwards from the cross support member 74. Optionally, the frame can include additional support posts as well, such as the support posts 92, which can be used for the same purpose or a different purpose as the support posts 90. The support posts 90 are positioned to support the tray 34 when the fiber manager 30 is in the configuration shown in FIG. 4. In particular, the support posts 90 support the tray such that the tray 34 is spaced from the connectors and connector ports, providing greater clearance for the routing and bending of fibers extending from the connectors mated at the connector ports that are above the tray 34. The support posts 90, 92 as well as the various fiber guides, can additionally optionally serve as bend radius limiters for optical fibers.

On the side of the pivot axis 44 (FIG. 5), the outer wall 62 defines an inwardly projecting support wall 71 having a lower support surface 93. Adjacent the support wall 71 the outer wall 62 defines a retainer opening 83. The outer wall 62 is continuous across a bottom of the retainer opening 83. Opposite the side of the pivot axis, the outer wall 62 defines an inwardly projecting support wall 85 having a lower support surface 91. Adjacent the support wall 85 the outer wall 62 defines a retainer opening 87. A discontinuity 89 in a portion of the outer wall 62 facilitates access to the retainer opening 87 when the frame 32 is seated in the housing. For example a prying tool (such as the head of a screwdriver) can be inserted into the retainer opening 83 via the discontinuity 89. Such a tool can be used to disconnect the tray 34 from the frame 32 on that side in order to pivot the tray 34 about the pivot axis 44.

The front portion 64 of the outer wall 62 defines a passage 94 aligned with the cable port 36 when the frame 32 is seated in the housing piece 12, 12', 12" so that fibers from a main cable 37 positioned in the cable port 36 can pass easily into the fiber management volume.

Adjacent the back 56, and partially extending from the back portion 66 of the outer wall 62, the frame 32 defines a holder 96 for a fiber management module, such as a splitter module. The holder 96 includes a seat 99 and a support wall 98. A plurality of retention features 100 (e.g., flex tabs or latches) are also provided to retain the splitter module within the seat. Fibers going into and out of the splitter module can be guided through fiber guides 102 (which can also function as bend radius limiters) on either side of the holder 96. Either or both the fibers that are input to or output from the splitter held in the holder 96 can be routed and managed on the tray 34. Typically, the splitter output fibers are routed to connector ports 22, while the splitter input fiber is routed to the tray 34.

Figure 12:
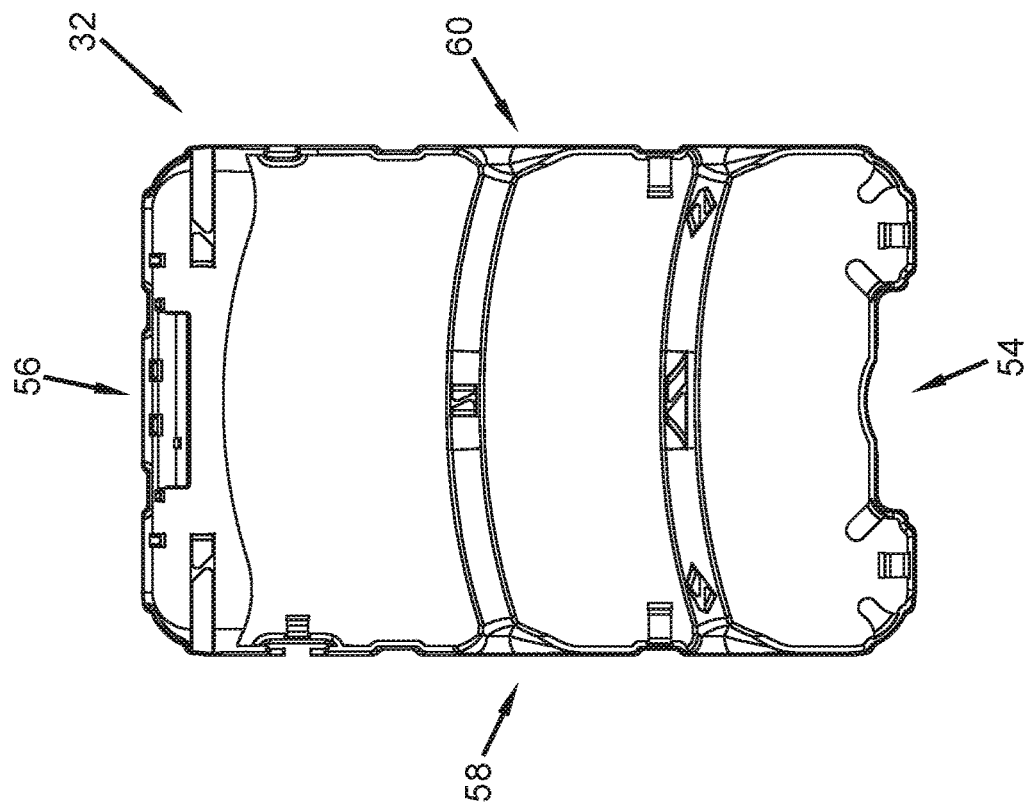
FIG. 12 is a bottom view of the frame of the fiber manager of FIGS. 4-6.
Figure 13:
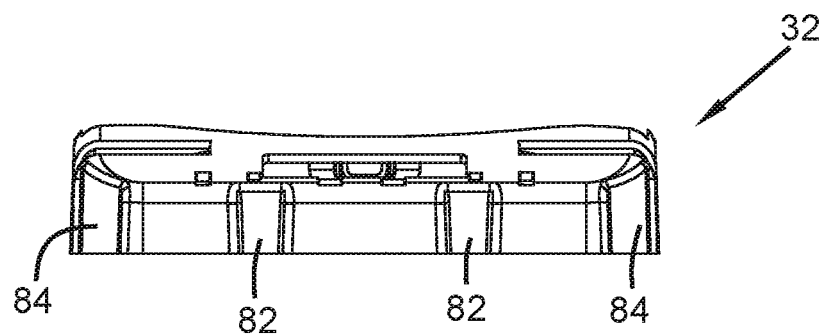
FIG. 13 is an end view of the frame of the fiber manager of FIGS. 4-6.
Figure 14:
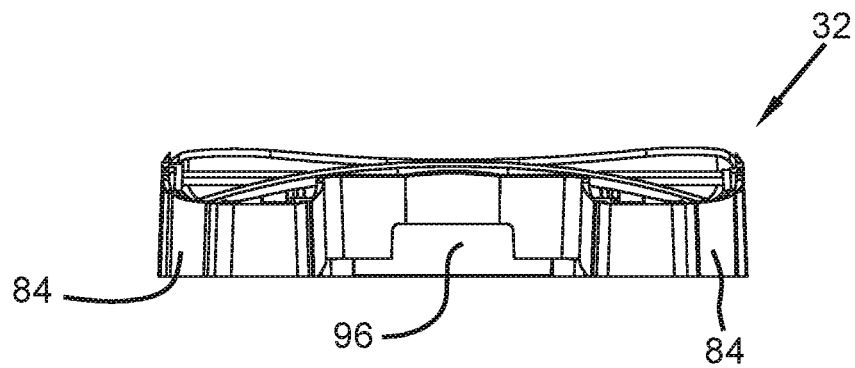
FIG. 14 is a further end view of the frame of the fiber manager of FIGS. 4-6.
Figure 15:
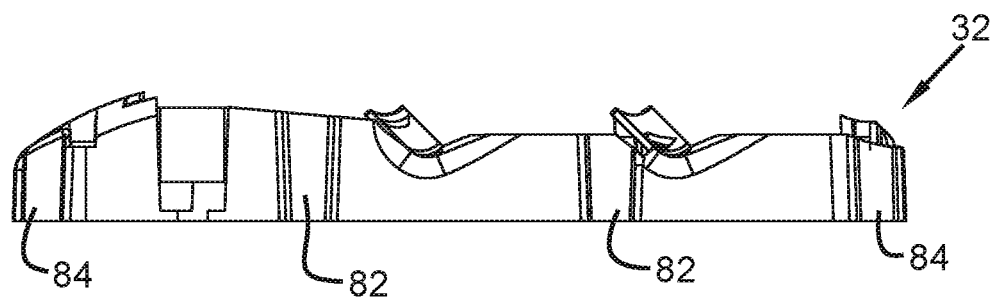
FIG. 15 is a side view of the frame of the fiber manager of FIGS. 4-6.
Figure 16:
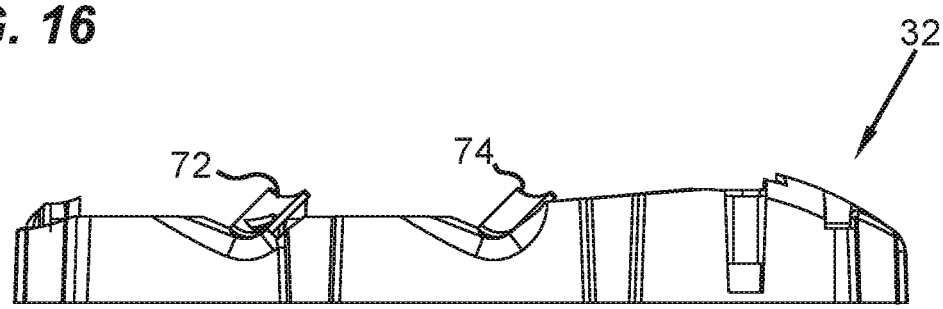
FIG. 16 is a further side view of the frame of the fiber manager of FIGS. 4-6.
Figure 17:
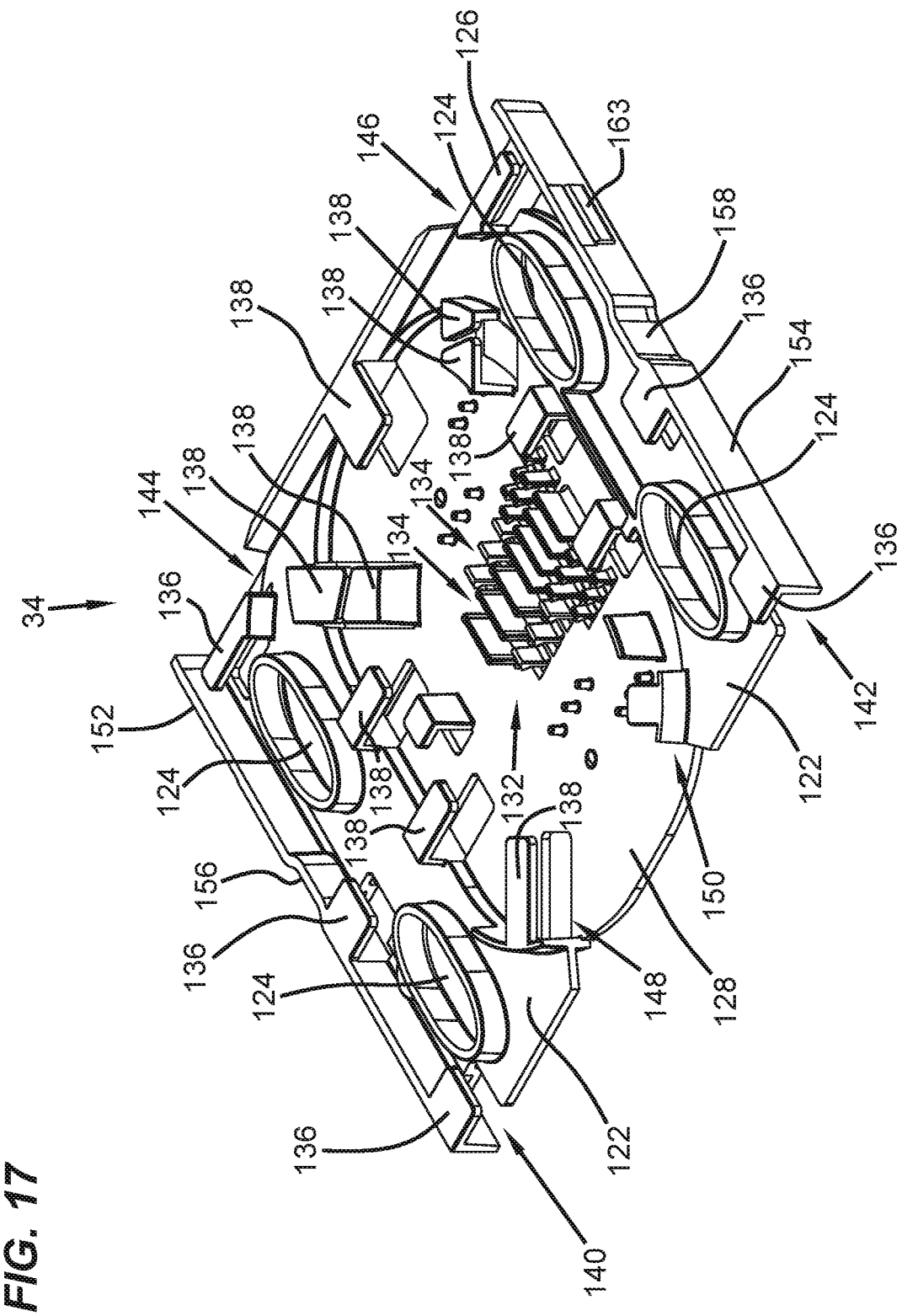
FIG. 17 is a perspective view of the fiber management tray of the fiber manager of FIGS. 4-6.
Figure 18:
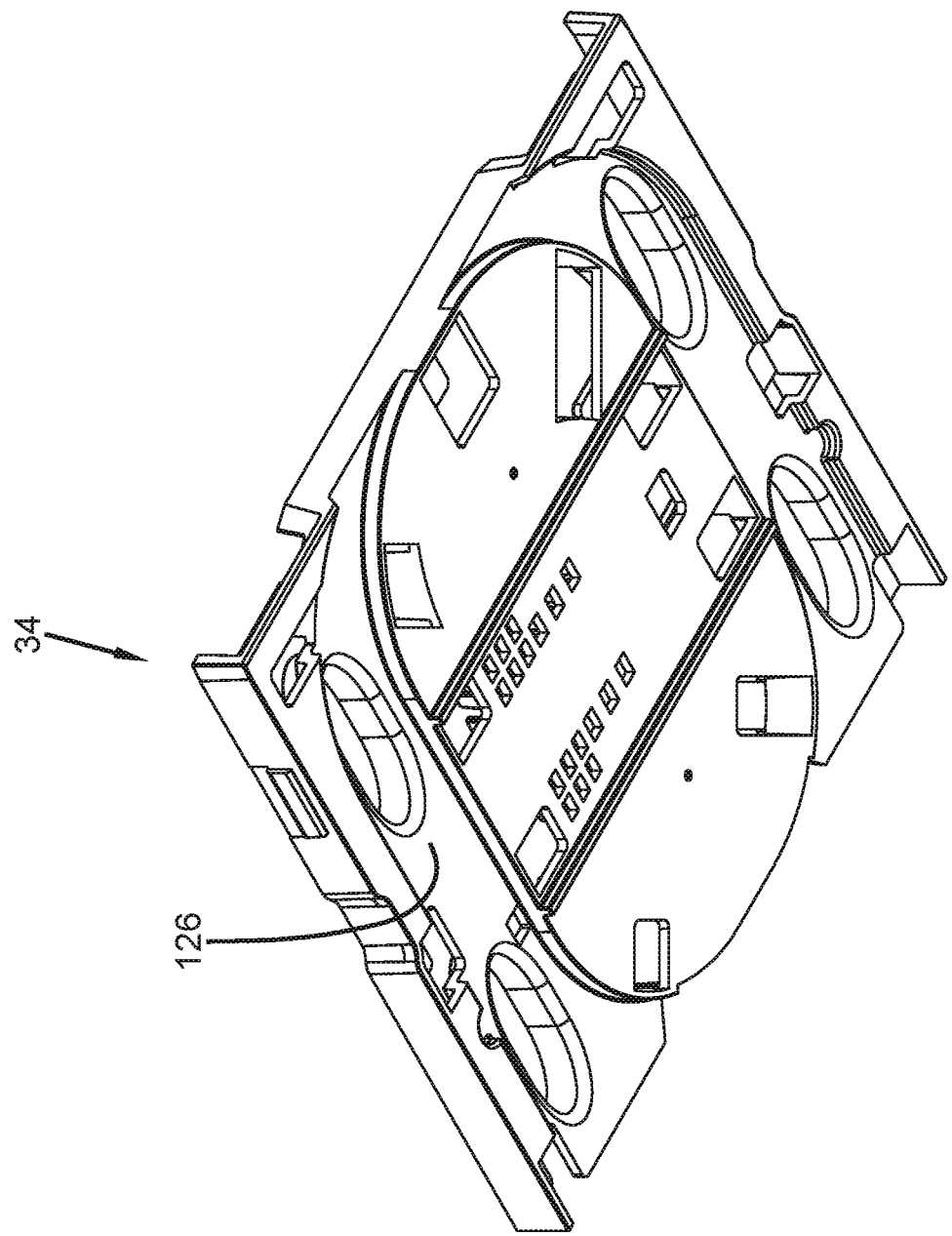
FIG. 18 is a further perspective view of the fiber management tray of the fiber manager of FIGS. 4-6.
Figure 19:
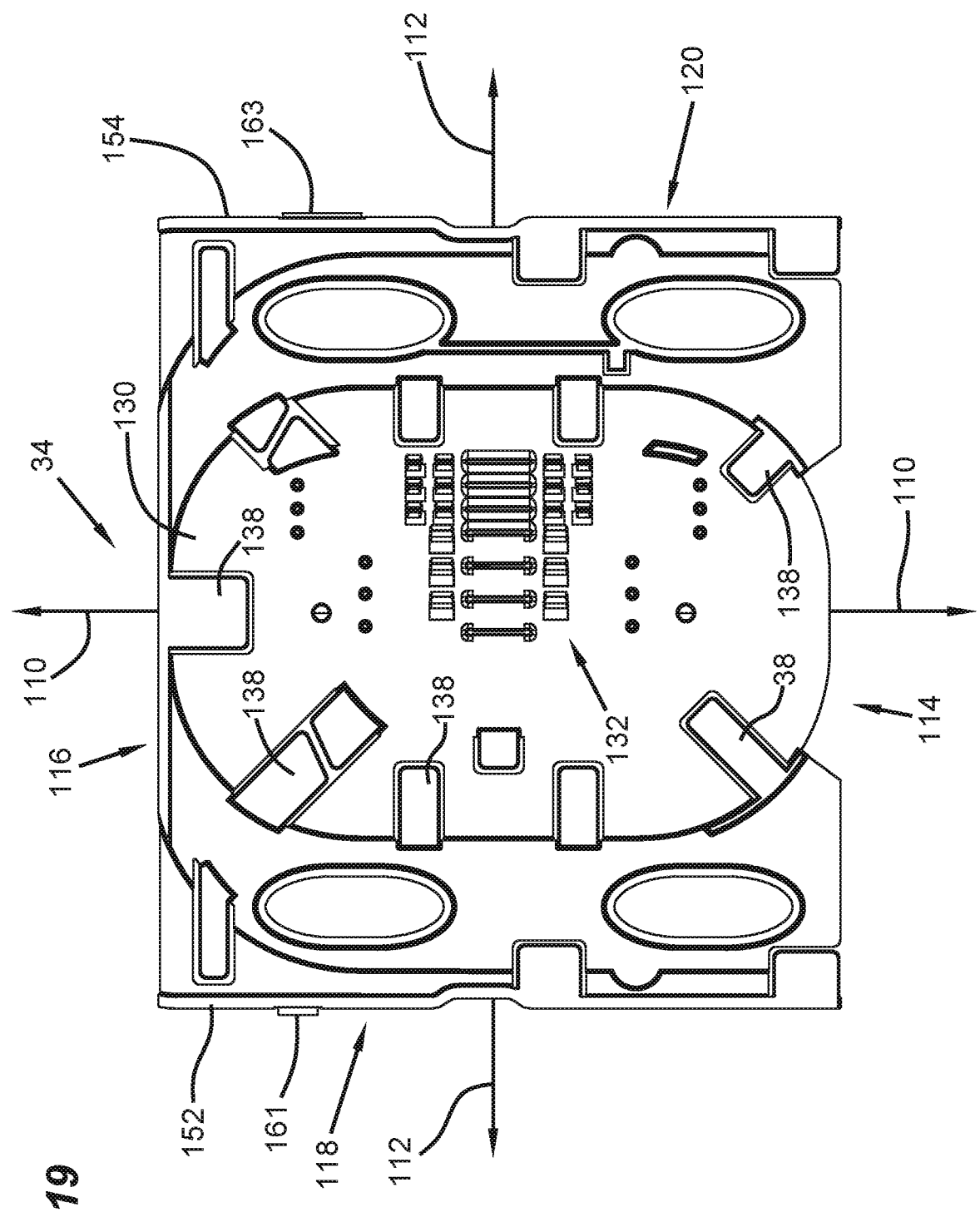
FIG. 19 is a bottom view of the fiber management tray of the fiber manager of FIGS. 4-6.
Figure 20:
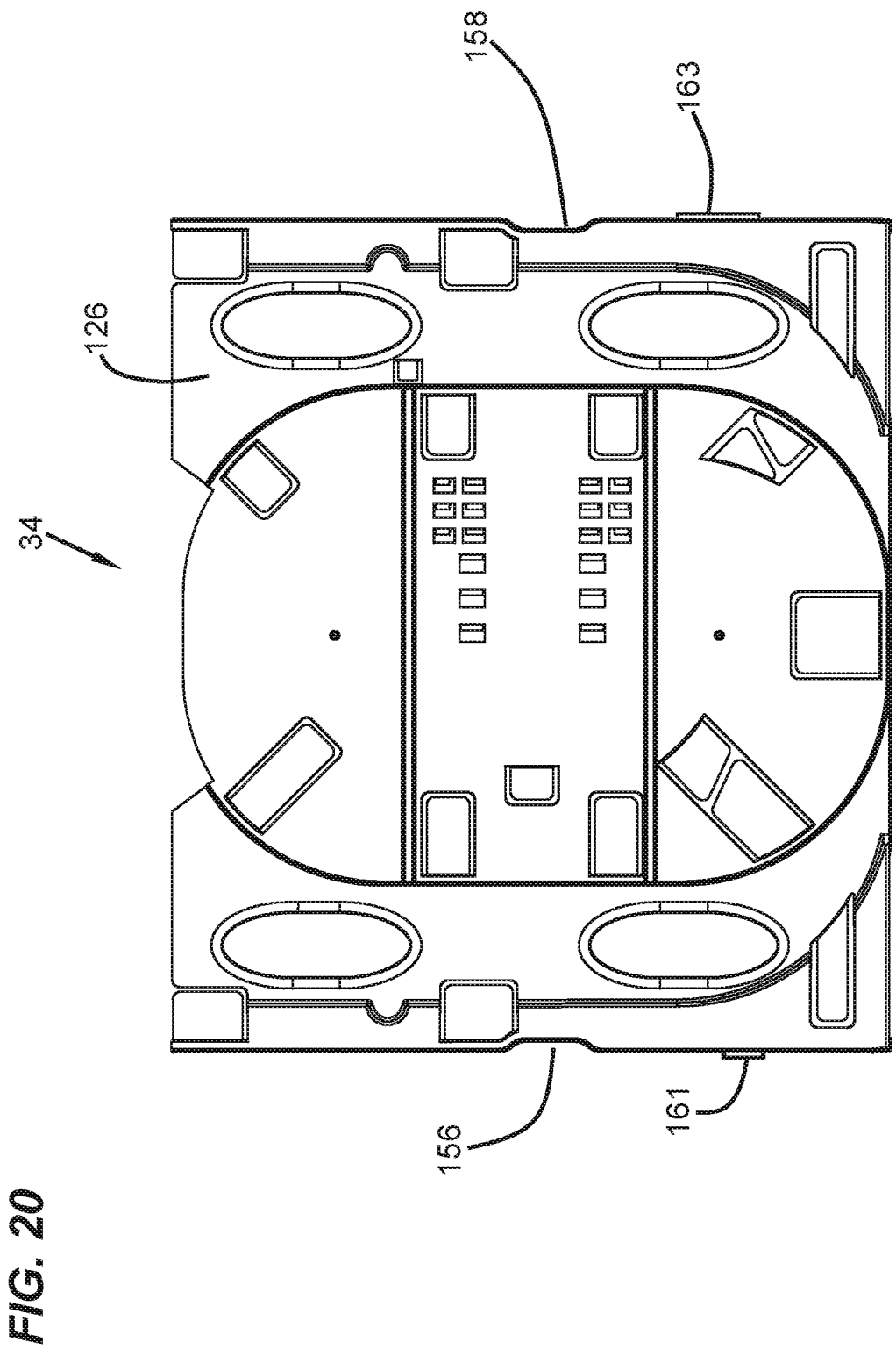
FIG. 20 is a top view of the fiber management tray of the fiber manager of FIGS. 4-6.

Referring now to FIGS. 17-20, the tray 34 will be described in more detail. The tray 34 extends along a first axis 110 between a front 114 and a back 116, and along a second axis 112 between opposite sides 118 and 120. The axes 110 and 112 are perpendicular to each other. When the manager 30 is assembled (FIG. 4), the axis 110 is parallel to the axis 50 (FIG. 12) and the axis 112 is parallel to the axis 52 (FIG. 12).

The tray 34 includes a support surface 122. The support surface 122 defines apertures 124 adequately sized and positioned to be aligned with, and to provide clearance for, portions of connectors installed in corresponding ones of the connector ports 22 when the manager 30 is in the configuration of FIG. 4 within the housing piece 12, 12', 12". For example, the apertures 124 are elongated parallel to the axis 110. In this manner, connectorized fibers whose connectors are mated at the ports 22 do not immediately encounter the opposite surface 126 of the support surface 122, which could disadvantageously cause the fibers to bend beyond their minimum bend radii. Thus, the apertures provide connector and fiber clearance for corresponding connector ports 22.

The tray 34 also includes a fiber management surface 128 which has an opposite side 130. The fiber management surface 128 is recessed relative to the support surface 122, which provides additional room to route, e.g., larger numbers or wider sets of fibers (such as ribbon fibers) on the fiber management surface 128.

The fiber management surface 128 includes, defines, and/or provides a support for one or more fiber management components. In this example, the fiber management surface 128 includes a block 132 of splice body holders 134. The splice body holders are configured to hold splice bodies for single fiber to fiber splices and/or multi-fiber to multi-fiber splices, such as splices for ribbon fibers. In a given block of splice body holders, some of the splice body holders can be configured to accommodate single splice bodies and others can be configured to accommodate multi-splice bodies (e.g., for ribbon fibers).

The tray 34 includes a first set of tabs 136 spaced from and below the support surface 122 and arranged to guide optical fibers adjacent an outer periphery of the support surface 122. The tabs extend from supports that can function as bend radius limiters for fibers. The tray 34 also includes a second set of tabs 138 spaced from and below the fiber management surface 128 and arranged to guide optical fibers adjacent an outer periphery of the fiber management surface 128.

Fibers are typically fed onto the tray 34 via one of, but not both of, the entryways 140, 142 at one of the sides 118, 120 of the tray 34, the chosen side corresponding to the side of the manager 30 that will define the pivot axis 44 (FIG. 5). The particular fiber manager 30 is configured for fibers to be fed onto/off of the tray 34 via the entryway 140 (corresponding to the pivot access side of the tray) but not the entryway 142. They can then be routed and guided via some of the tabs 136 onto the management surface 128, where they can be routed and guided in slack loops and/or partial loops, and/or to the splice holder block 132 with the tabs 136. In addition or alternatively, fibers can enter and/or leave the tray 34 at the back 116 via the entryways 144, 146. In addition or alternatively, fibers can enter and/or leave the tray 34 via the entryways 148, 150, which lead directly to the management support surface 128.

Figure 9:
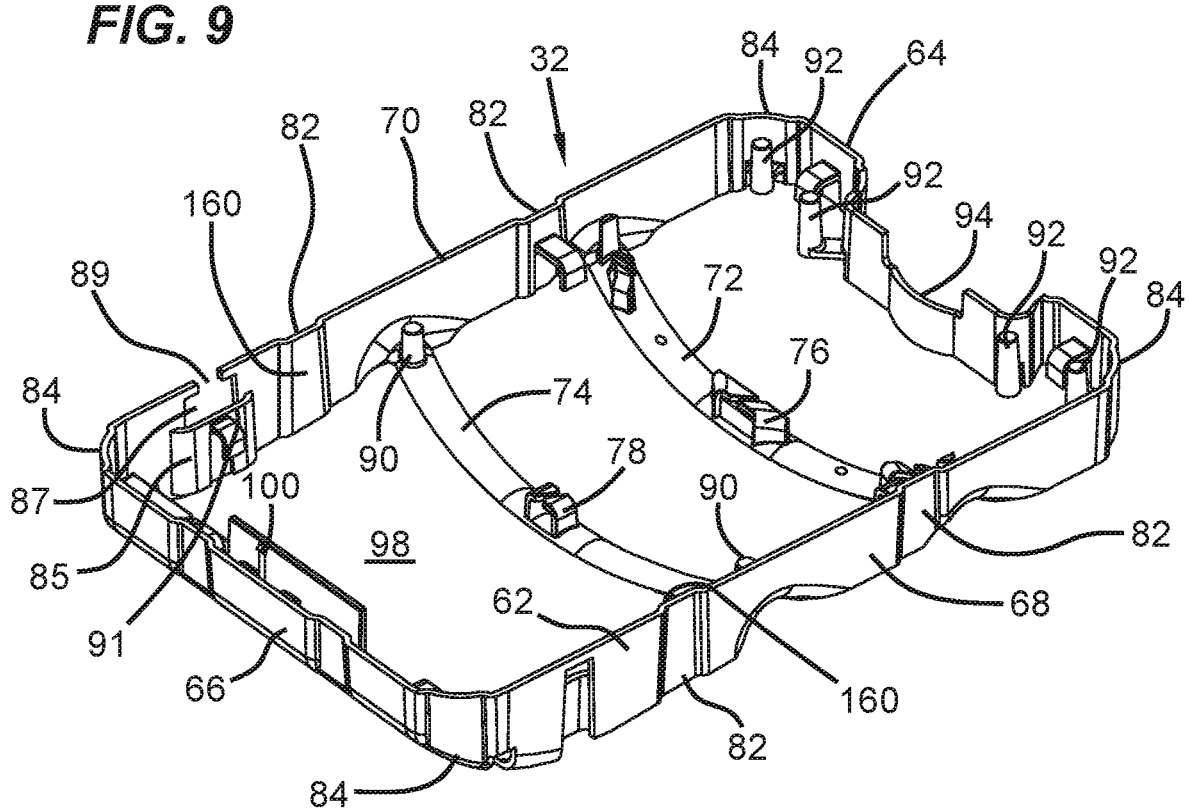
FIG. 9 is a perspective view of the frame of the fiber manager of FIGS. 4-6.
Figure 10:
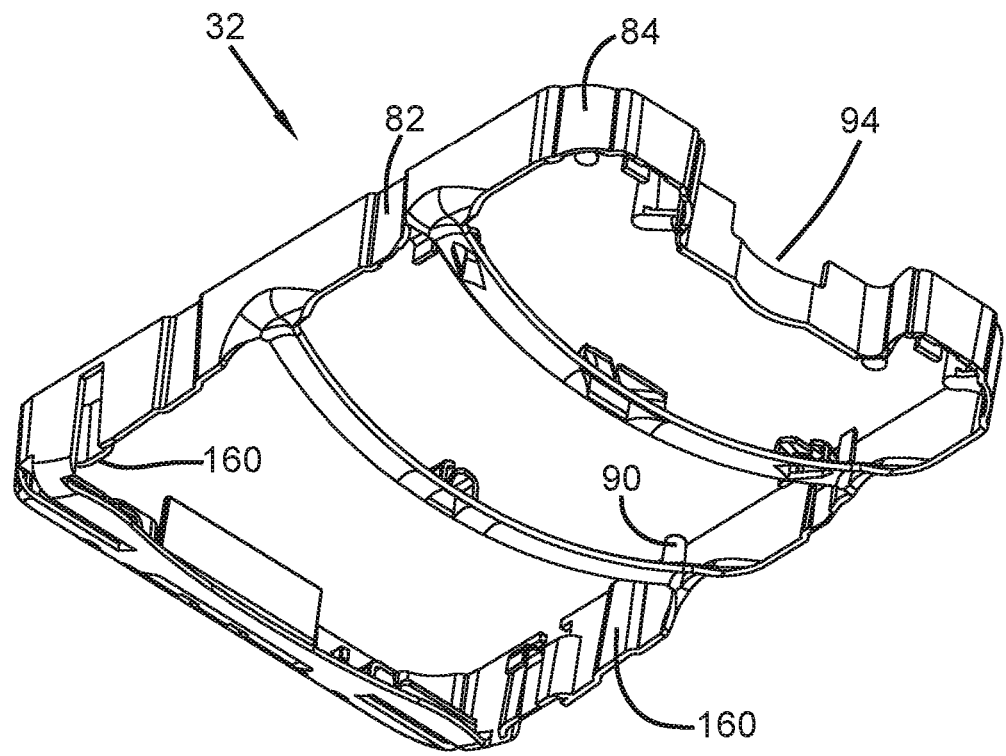
FIG. 10 is a further perspective view of the frame of the fiber manager of FIGS. 4-6.
Figure 11:
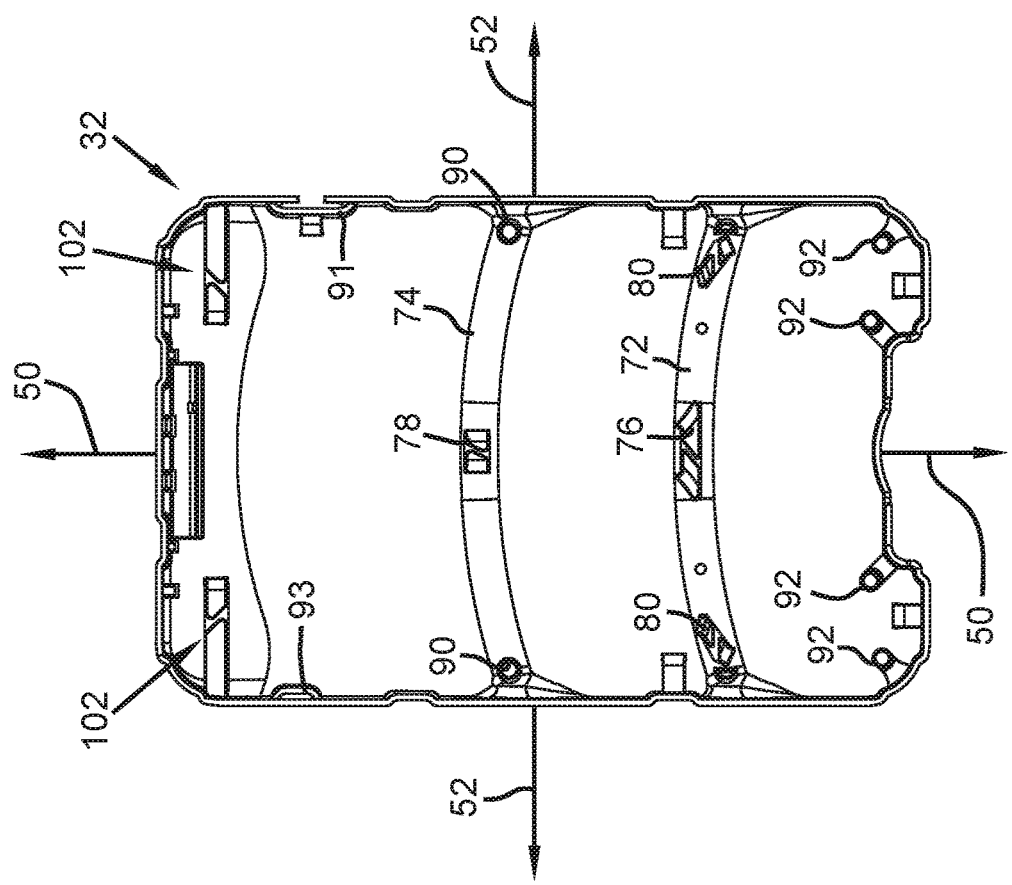
FIG. 11 is a top view of the frame of the fiber manager of FIGS. 4-6.

Sidewalls 152 and 154 of the tray 34 define recesses 156, 158 configured to conform to and couple by interference fit to ribs 160 defined by the outer wall 62 of the frame 32 (FIGS. 9-10). Conveniently (e.g., to minimize weight and/or manufacturing cost), in this example the ribs 160 are formed on portions of an interior surface of the outer wall 62 whose corresponding outer portions define two of the recesses 82 that are configured to couple to the interior wall 18 of the housing piece 12. The ribs 160 and recesses 156, 158 can be tapered to facilitate coupling of the tray 34 to the frame 32.

A retainer projection 161 projects parallel to the axis 112 from the sidewall 152. A retainer projection 163 projects parallel to the axis 112 from the side wall 154. The projection 163 is longer in its dimension parallel to the axis 110 than the projection 161. The retainer projections 161, 163 are configured to cooperate with the retainer openings 83 and 87 of the frame 32. In particular, when the manager 30 is in the configuration shown, e.g., in FIG. 4, the projection 161 has been resiliently snapped into the retainer opening 83 and the projection 163 has been resiliently snapped into the retainer opening 87, while a top surface of the side wall 152 is supported by the lower support surface 93 projecting support wall 71 and a top surface of the side wall 154 is supported by the lower support surface 91 of the projecting support wall 85. To move the manager to the configuration of FIGS. 5-6, a prying tool can be inserted into the retainer opening 87 through the wall discontinuity 89 (FIG. 9), such that the tool engages the retainer projection 163 and can be used to disengage the projection 163 from the retainer opening 87 to pivot the tray relative to the frame about the pivot axis 44.

Figure 22:
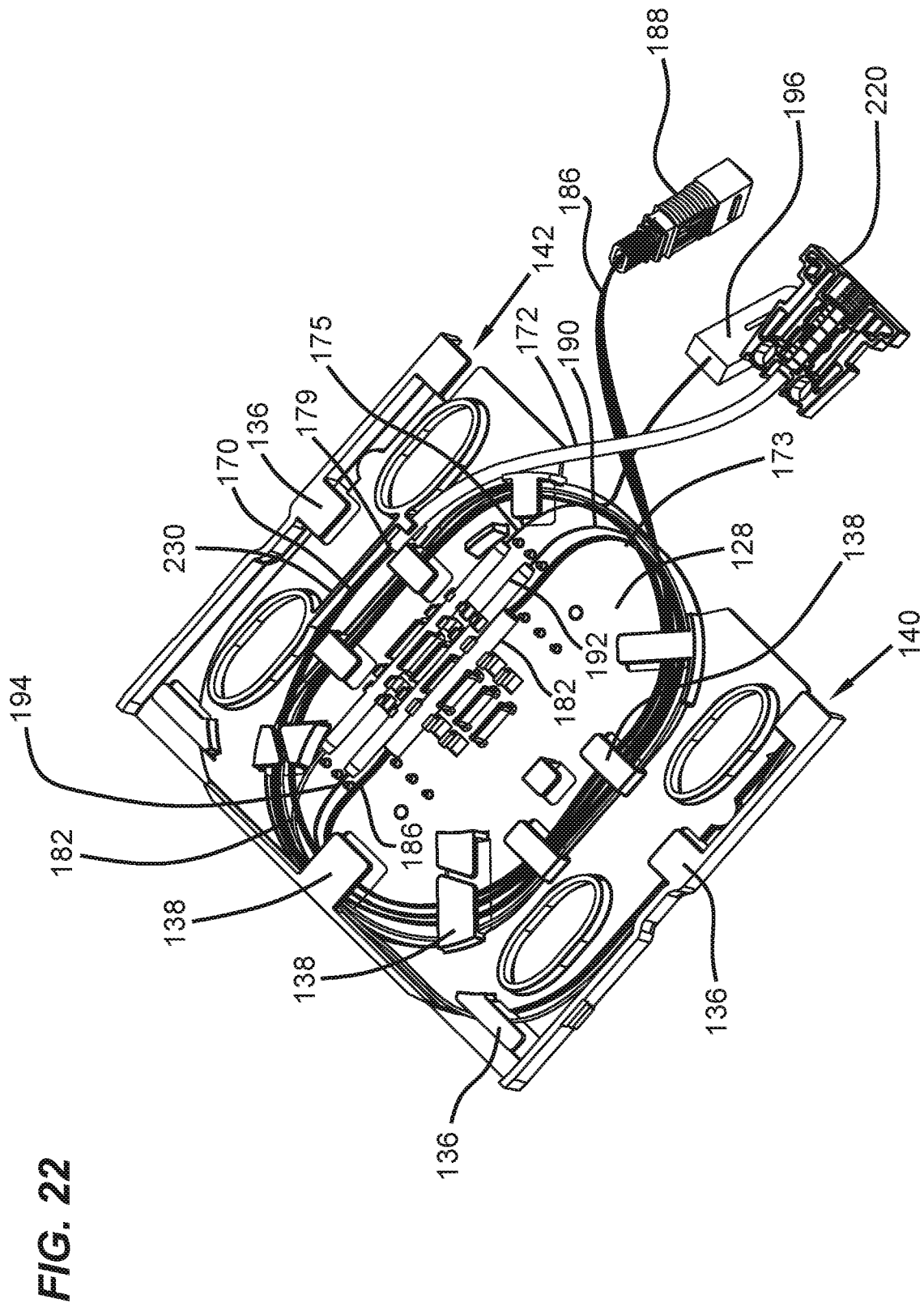
FIG. 22 is a perspective view illustrating a portion of the example fiber routing scheme of FIG. 21.
Figure 23:
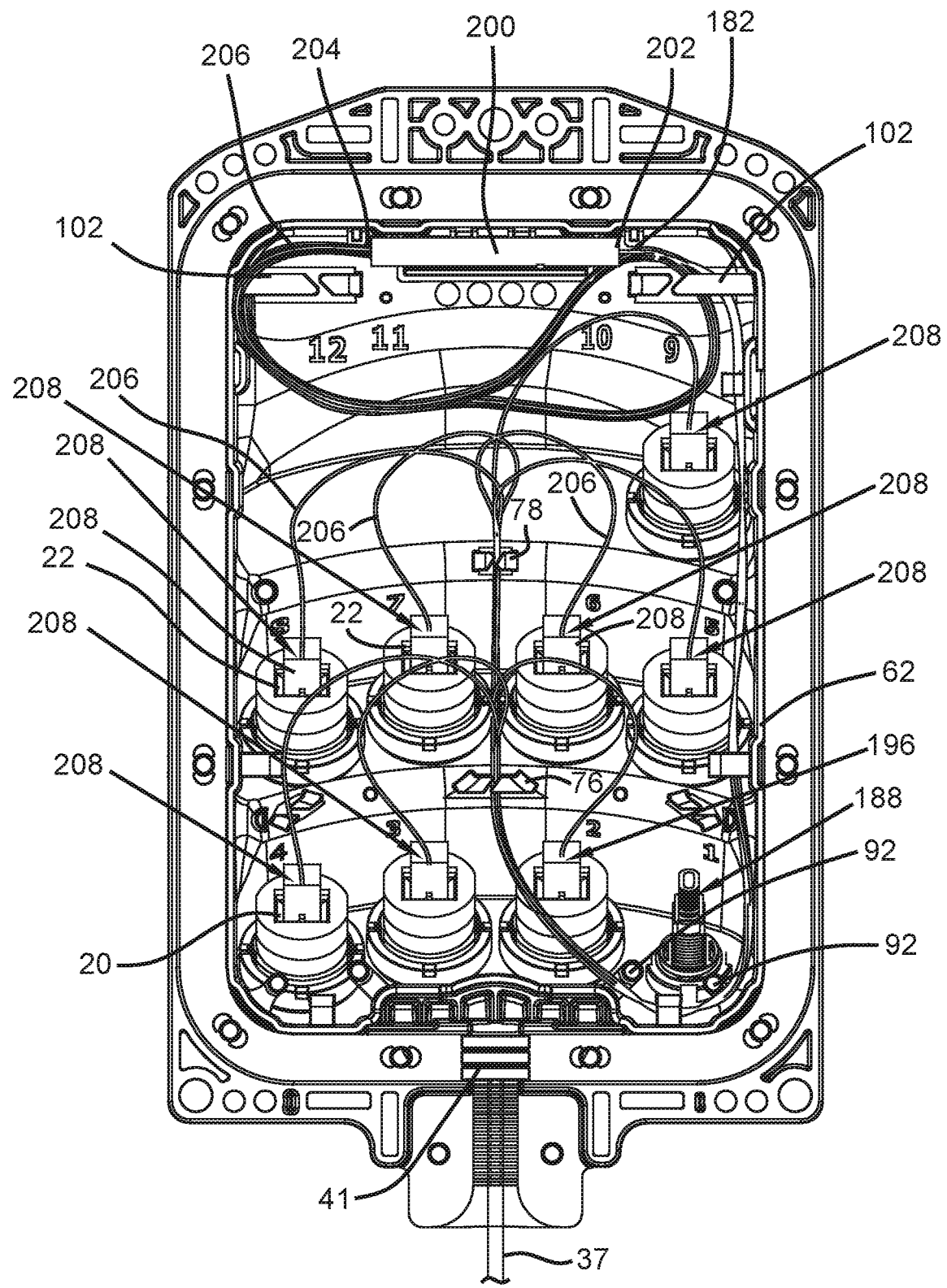
FIG. 23 is bottom view of a further portion of the closure of FIG. 4, illustrating a further portion of the example fiber routing scheme of FIG. 21.

Referring now to FIGS. 21-23, an example fiber routing scheme using the manager 30 is depicted. It should be appreciated that the routing scheme depicted is one of many possibilities depending on particular connectivity needs for a given closure.

In the example routing scheme depicted, fibers 170 enter the closure via the main cable port 36 and are protected by a buffer tube 172 which is mounted in a tube guiding component 220. The tube 172 extends onto the fiber organizing surface 128 of the tray 34. The tube guiding components 220 is mounted adjacent the passage 94 defined by the frame 32. The fibers 170 extend beyond the end 179 of the buffer tube 172 and are looped in slack loops using the tabs 138. The fibers 170 are spliced at the block 132 of splice body holders. In particular, the fibers 170 include a single fiber 173 and a ribbon fiber 175. The single fiber 173 is spliced at a single-splice body 180 to the splitter input fiber 182. The ribbon fiber 175 is spliced at a multi-splice body 184 to a connectorized ribbon fiber 186, the ribbon fiber 186 being terminated at a MPO connector 188 that is received and held in a connector port 20a having a MPO adapter. The MPO connector 188 does not include a strain relief boot in order to facilitate keeping the ribbon fiber 186 within the fiber management volume 16 without its extending through the plane defined by the plane of the page of FIG. 23. A single fiber connectorized pigtail 190 is spliced to another single fiber pigtail 194 at single splice body 192. The single fiber 190 is terminated at a connector 196 that is received and held in a connector port 20b.

The connectorized ribbon fiber 186 enters/exits the fiber management surface 128 via the entryway 148 and is guided by the tabs 138. The tray 34 can include a guide wall 230 to guide the buffer tube 172 and the fibers 177 onto the fiber support surface 128. The single connectorized fiber 190 enters/exits the fiber support surface 128 via the entryway 150. The splitter input fiber 182 enters/exits the tray 34 via the entryway 140.

The splitter input fiber 182 enters/exits the tray via the entryway 142 and is routed above the tray 34 to the input side 202 of the splitter module 200 held in the holder 96. On the output side 204 of the splitter module 200, one or more of the splitter output fibers 206 are terminated at connectors 208 received and held in connector ports 22, 20. As shown in FIG. 23, routing paths and bend radii can be controlled by using the guides 76, 78, and 102, as well as the posts 90.

As shown in FIG. 21, the apertures 124 provide clearance for connectors 208 aligned with the apertures 124 and provide space for fibers extending from those connectors to be routed without exceeding their bend radii as they extend from the connectors. For example, sections of the fibers can enter into the vertical (defined between top and bottom of the closure) space defined by the apertures 124.

Figure 24:
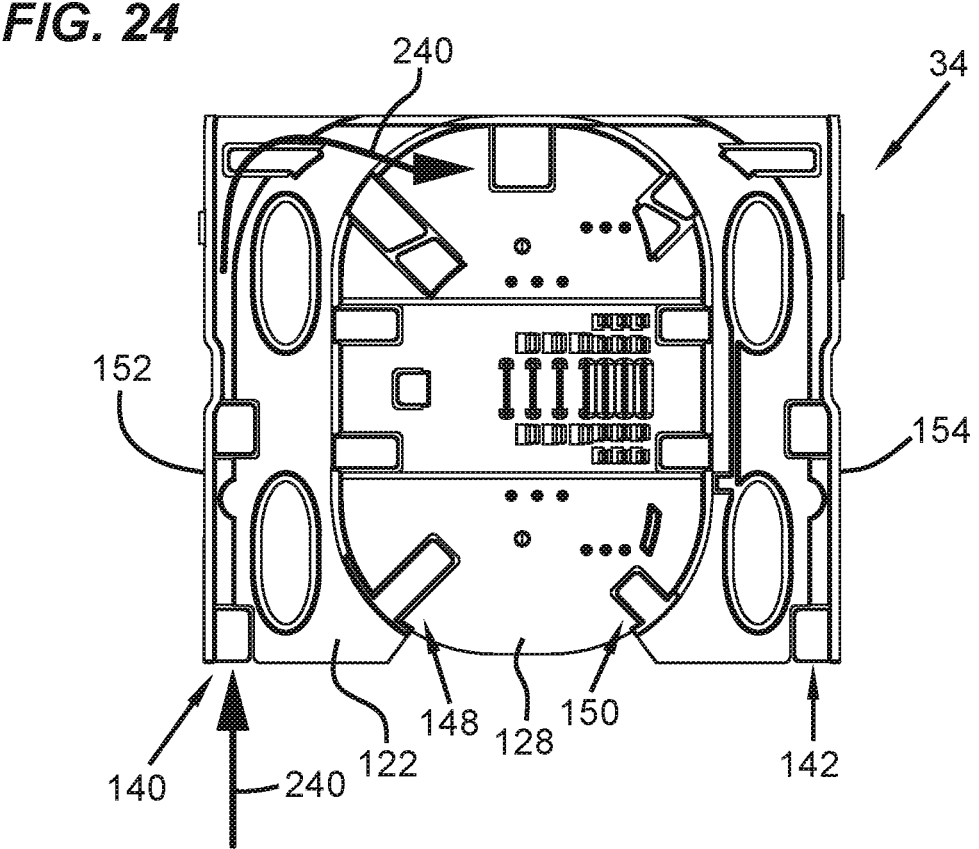
FIG. 24 illustrates a fiber routing step using the fiber management tray of the fiber manager of FIGS. 4-6.

Referring to FIG. 24, the arrows 240 indicate an example routing direction for the splitter input fiber 182 on the tray 34 via the entryway 140.

Figure 25:
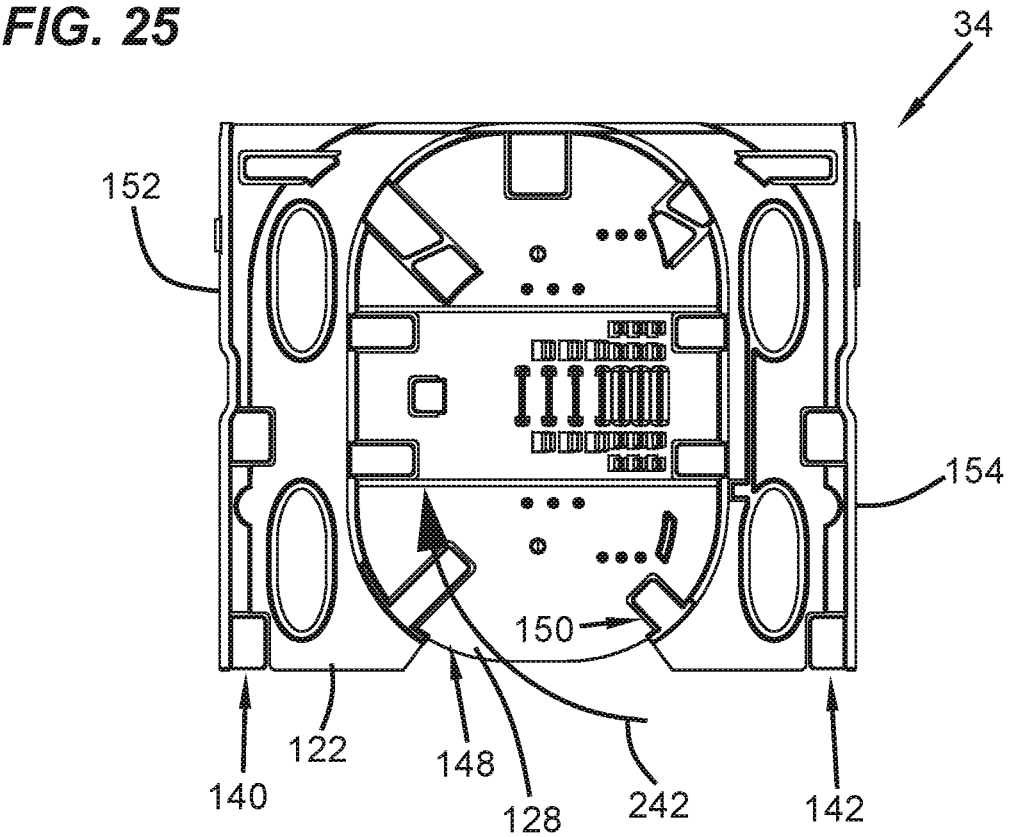
FIG. 25 illustrates a further fiber routing step using the fiber management tray of the fiber manager of FIGS. 4-6.

Referring to FIG. 25, the arrow 242 indicates an example routing direction for the connectorized ribbon fiber 186 on the tray 34 via the entryway 148.

Figure 26:
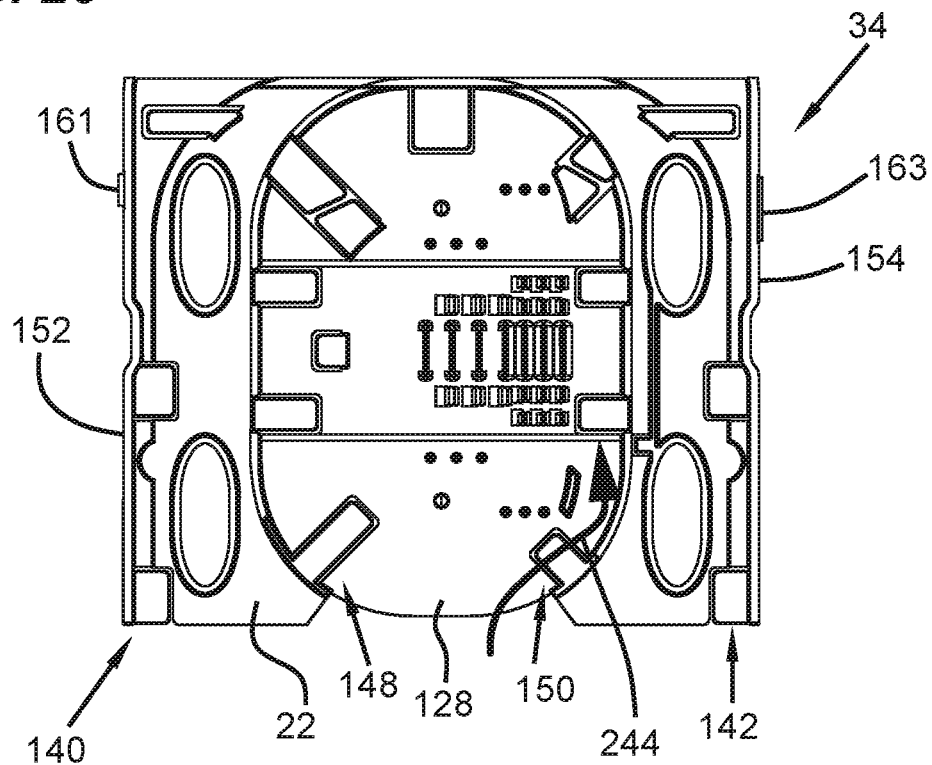
FIG. 26 illustrates a further fiber routing step using the fiber management tray of the fiber manager of FIGS. 4-6.

Referring to FIG. 26, the arrow 244 indicates an example routing direction for the connectorized individual fiber 190 on the tray 34 via the entryway 250.

Figure 27:
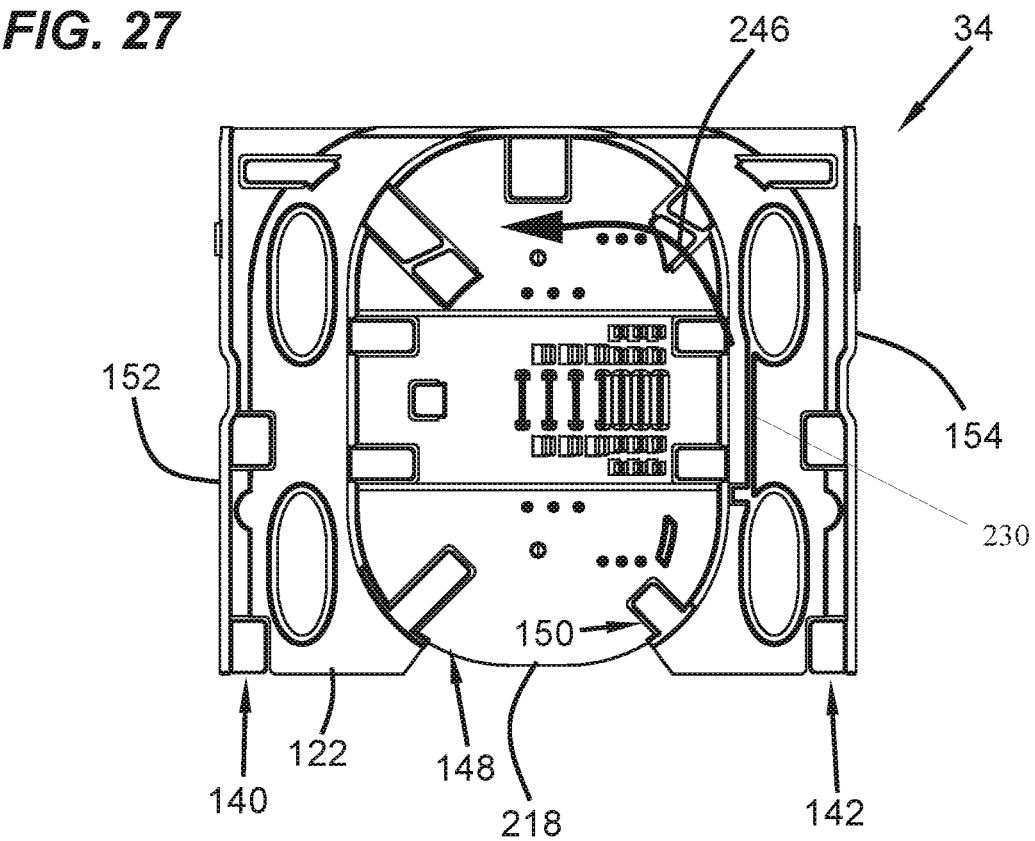
FIG. 27 illustrates a further fiber routing step using the fiber management tray of the fiber manager of FIGS. 4-6.

Referring to FIG. 27, the arrow 246 indicates an example routing direction for the fibers 177 extending from the buffer tube 172 on the tray 34, guided by the guide wall 230.

Figure 28:
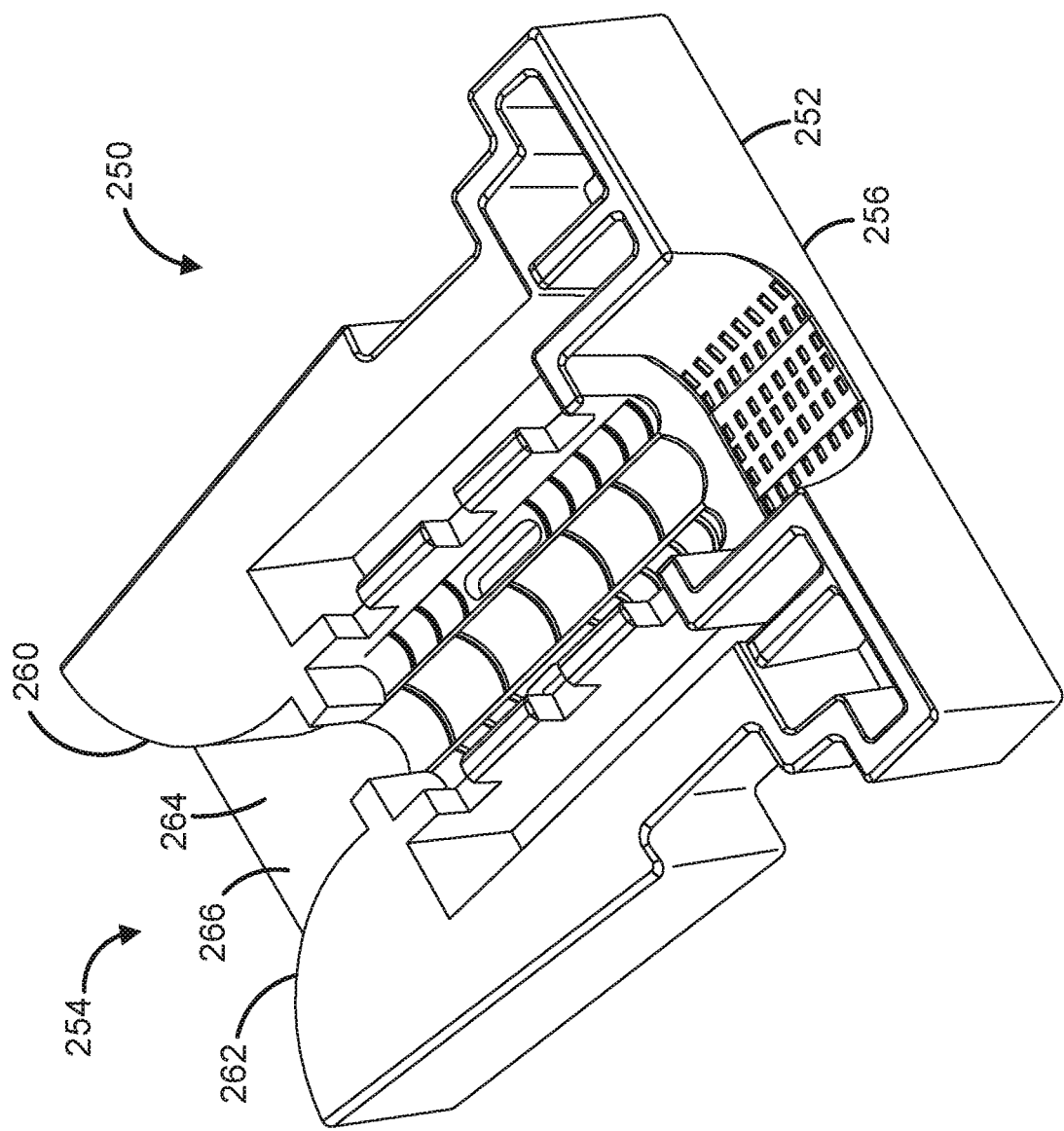
FIG. 28 is a perspective view of an alternative embodiment of a tube guiding component that can be used with the closures of the present disclosure.

Referring to FIG. 28, a further embodiment of a tube guiding component 250 is depicted. The tube guiding component 250 can be substituted for the tube guiding component 220 described above. The tube guiding component 250 has a front 252 and a back 254. Adjacent the front 252 is a pocket 256. The pocket 256, e.g., can be filled with adhesive or a potting material or sealant and receives the jacketed main cable or fibers thereof. A buffer tube receiving channel 258 extends rearwards from the pocket 256 and is adapted to receive a buffer tube carrying fibers from the main cable. The buffer tube receiving channel 258 opens rearwardly into a guide channel 264 defined by opposing walls 260 and 262 and a floor 266. The opposing walls 260 and 262 are rounded and curve away from each other as the guide channel 264 extends rearwards towards the back end 254. The smooth curvature of the opposing walls 260 and 262 can minimize damage to the buffer tube as it is routed from the component 250 to the tray 34.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A telecommunications closure, comprising:
   first and second housing pieces configured to cooperate to define a re-enterable closure volume, the first housing piece including a plurality of connector ports adapted to mate with fiber optic connectors and an interior wall that defines a fiber management volume of the closure volume; and
   a frame configured to connect to a fiber management tray, the frame including an outer wall defining an opening within the frame and configured to conform to the interior wall of the first housing piece, a plurality of the connector ports being accessible through the opening defined by the outer wall of the frame for installing connectors in, or removing the connectors from, the plurality of the connector ports when the frame is coupled to the first housing piece.

2. The telecommunications closure of claim 1, wherein the outer wall of the frame includes first and second portions elongated parallel to a first dimension of the frame and on opposite first and second sides of the frame, respectively, and third and fourth portions elongated parallel to a second dimension of the frame and on opposite third and fourth sides of the frame, respectively, the first and second dimensions being perpendicular to each other,
   wherein the first, second, third, and fourth portions of the outer wall of the frame are configured to couple to corresponding portions of the interior wall by interference fit.

3. The telecommunications closure of claim 2, wherein the frame comprises a support member extending between the first and second portions of the outer wall.

4. The telecommunications closure of claim 3, wherein the support member defines one or more fiber guiding features.

5. The telecommunications closure of claim 1, wherein the frame defines a holder for a fiber management module.

6. The telecommunications closure of claim 5, wherein the holder is configured to hold a splitter module.

7. The telecommunications closure of claim 1,
   wherein the first housing piece defines a main cable entry port;
   wherein the closure comprises a tube guiding component adjacent the main cable entry port and positioned within the closure volume, the tube guiding component defining a channel having opposing walls, the channel being adapted to receive a tube containing one or more optical fibers; and
   wherein portions of the opposing walls are rounded and curve away from each other towards an end of the tube guiding component.

8. The telecommunications closure of claim 7, wherein a first optical fiber passes through the main entry port and is routed, within the closure volume, through the channel of the tube guiding component and to a second optical fiber that is spliced to the first optical fiber, the second optical fiber having a connectorized end configured to mate with one of the connector ports.

9. The telecommunications closure of claim 1, wherein the telecommunications closure is a multiport service terminal.

10. The telecommunications closure of claim 1, further comprising the fiber management tray connected to the frame.

11. A telecommunications closure, comprising:
    first and second housing pieces configured to cooperate to define a re-enterable closure volume, the first housing piece including a plurality of connector ports adapted to mate with fiber optic connectors and an interior wall that defines a fiber management volume of the closure volume; and
    a fiber manager comprising:
      a frame, the frame including an outer wall defining an opening within the frame and configured to conform to the interior wall of the first housing piece; and
      a fiber organizing tray, the fiber organizing tray and the frame being configured to cooperate to define first and second configurations of the fiber manager,
    wherein in the first configuration first and second opposite sides of the tray are connected to first and second opposing sides, respectively, of the outer wall of the frame; and
    wherein in the second configuration one of the first and second opposite sides of the tray is not connected to the corresponding first or second side of the outer wall such that a first of the connector ports is accessible through the opening defined by the outer wall of the frame for installing a connector in, or removing the connector from, the first connector port.

12. The telecommunications closure of claim 11, wherein the tray includes a support surface, the support surface defining apertures positioned to be aligned with, and to provide clearance for, portions of connectors installed in the connector ports.

13. The telecommunications closure of claim 12, wherein the tray includes a first set of tabs spaced from the support surface and arranged to guide optical fibers adjacent an outer periphery of the support surface.

14. The telecommunications closure of claim 11, wherein the tray includes a fiber management surface connected to the support surface, the tray further including structures extending from the fiber management surface and configured to hold splice bodies of fiber optic splices.

15. The telecommunications closure of claim 14, wherein the fiber management surface is recessed relative to the support surface.

16. The telecommunications closure of claim 11, wherein the tray and the frame are configured, in the first configuration, to couple to each other at least in part by interference fit between features having complementary geometry.

17. The telecommunications closure of claim 11, wherein the frame includes one or more cross support members and a plurality of posts extending from the one or more cross support members, and wherein the tray is supported on the posts in the first configuration.

18. The telecommunications closure of claim 11, wherein in the second configuration, one of the first and second opposite sides of the tray is pivoted away from the frame while the other of the first and second opposite sides remains connected to the corresponding first or second side of the outer wall of the frame.

19. The telecommunications closure of claim 11, wherein the frame is configured to couple to the interior wall by interference fit.

20. A telecommunications closure, comprising:
first and second housing pieces configured to cooperate at an interface to define a re-enterable closure volume, the first housing piece including an interior wall that defines a fiber management volume of the closure volume, the fiber management volume being bounded by a reference plane defined by the interface, the first housing piece including a plurality of connector ports adapted to mate with fiber optic connectors; and
a fiber manager comprising:
a frame, the frame including an outer wall defining an opening within the frame and configured to conform to the interior wall of the first housing piece; and
a fiber organizing tray, the fiber organizing tray and the frame being configured to cooperate with each other and with the first housing piece such that no portion of the frame or the fiber organizing extends through the reference plane.

21. The telecommunications closure of claim 20, wherein the fiber organizing tray, the frame and the first housing piece are configured to cooperate such that one or more portions of the fiber organizing tray and one or more portions of the frame extend to, but not through the reference plane.

22. The telecommunications closure of claim 20, wherein the interface is defined by a sealing component positioned between the first and second housing pieces.

23. The telecommunications closure of claim 20, wherein the fiber organizing tray and the frame are configured to cooperate to define first and second configurations of the fiber manager; wherein in the first configuration first and second opposite sides of the tray are connected to first and second opposing sides, respectively, of the outer wall of the frame; and wherein in the second configuration one of the first and second opposite sides of the tray is not connected to the corresponding first or second side of the outer wall such that a first of the connector ports is accessible through the opening defined by the outer wall of the frame for installing a connector in, or removing the connector from, the first connector port.

24. The telecommunications closure of claim 23, wherein in the second configuration, one of the first and second opposite sides of the tray is pivoted away from the frame while the other of the first and second opposite sides remains connected to the corresponding first or second side of the outer wall of the frame.

* * * * *